US009652776B2

(12) United States Patent
Olsen et al.

(10) Patent No.: US 9,652,776 B2
(45) Date of Patent: May 16, 2017

(54) VISUAL REPRESENTATIONS OF RECURRING REVENUE MANAGEMENT SYSTEM DATA AND PREDICTIONS

(71) Applicants: Greg Olsen, Menlo Park, CA (US); Ganesh Bell, San Francisco, CA (US); Ricardo Craft, Oakland, CA (US); Elaine Garvey, San Francisco, CA (US); Abhinav Vohra, San Francisco, CA (US); Kevin Smith, Denver, CO (US)

(72) Inventors: Greg Olsen, Menlo Park, CA (US); Ganesh Bell, San Francisco, CA (US); Ricardo Craft, Oakland, CA (US); Elaine Garvey, San Francisco, CA (US); Abhinav Vohra, San Francisco, CA (US); Kevin Smith, Denver, CO (US)

(*) Notice: Subject to any disclaimer, the term of this patent is extended or adjusted under 35 U.S.C. 154(b) by 660 days.

(21) Appl. No.: 13/895,302

(22) Filed: May 15, 2013

(65) Prior Publication Data

US 2013/0339089 A1  Dec. 19, 2013

Related U.S. Application Data

(63) Continuation-in-part of application No. 13/841,681, filed on Mar. 15, 2013, and a continuation-in-part of (Continued)

(51) Int. Cl.
    *G06Q 30/00* (2012.01)
    *G06Q 30/02* (2012.01)
    (Continued)

(52) U.S. Cl.
    CPC ..... *G06Q 30/0202* (2013.01); *G06F 17/3089* (2013.01); *G06Q 10/06375* (2013.01); *G06Q 30/02* (2013.01); *G06Q 30/06* (2013.01)

(58) Field of Classification Search
    None
    See application file for complete search history.

(56) References Cited

U.S. PATENT DOCUMENTS 4,354,225 A  10/1982  Frieder et al.
4,527,237 A  7/1985  Frieder et al.
(Continued)

OTHER PUBLICATIONS

Liberatore, Matthew J., and Wenhong Luo. "The Analytics Movement: Implications for Operations Research." Interfaces 40.4 (2010): 313-324.*

(Continued)

*Primary Examiner* — Gurkanwaljit Singh
(74) *Attorney, Agent, or Firm* — Mintz Levin Cohn Ferris Glovsky and Popeo, P.C.

(57) ABSTRACT

Visual representations of recurring revenue management system data and predictions are disclosed. A user interface is generated for an electronic display, the user interface including a graphical representation of one or more recurring revenue assets, the graphical representation representing each of the one or more recurring revenue assets according to one or more metrics that define each of the one or more recurring revenue assets. A predicted outcome for at least one of the one or more recurring revenue assets is predicted, the calculating being from a predictive model that is based on aggregate historical information collected from one or more data sources. A graphical representation of the predicted outcome is generated according to one or more parameters related to the one or more metrics, for concurrent display in the user interface with the graphical representation of one or more recurring revenue assets.

27 Claims, 20 Drawing Sheets

Related U.S. Application Data application No. 13/844,306, filed on Mar. 15, 2013, and a continuation-in-part of application No. 13/844,002, filed on Mar. 15, 2013, and a continuation-in-part of application No. 13/842,398, filed on Mar. 15, 2013, and a continuation-in-part of application No. 13/842,035, filed on Mar. 15, 2013.

(60) Provisional application No. 61/661,299, filed on Jun. 18, 2012.

(51) Int. Cl.
    *G06Q 10/06* (2012.01)
    *G06Q 30/06* (2012.01)
    *G06F 17/30* (2006.01)

(56) References Cited

U.S. PATENT DOCUMENTS

| | | | |
|---|---|---|---|
| 5,530,863 A | 6/1996 | Hino | |
| 5,550,734 A * | 8/1996 | Tarter | G06Q 10/10 705/2 |
| 5,704,044 A * | 12/1997 | Tarter | G06Q 10/10 705/2 |
| 6,131,085 A | 10/2000 | Rossides | |
| 6,473,794 B1 * | 10/2002 | Guheen | H04L 41/22 709/223 |
| 6,721,713 B1 * | 4/2004 | Guheen | G06Q 99/00 705/1.1 |
| 7,191,183 B1 * | 3/2007 | Goldstein | G06F 17/30893 705/2 |
| 7,315,826 B1 * | 1/2008 | Guheen | G06F 17/3089 703/27 |
| 7,425,700 B2 | 9/2008 | Stults et al. | |
| 8,001,013 B2 * | 8/2011 | Serbanescu | G06Q 30/0601 705/26.4 |
| 8,010,404 B1 | 8/2011 | Wu et al. | |
| 8,046,295 B1 | 10/2011 | Cohan | |
| 8,046,362 B2 | 10/2011 | Bayliss | |
| 8,140,381 B1 | 3/2012 | Wu et al. | |
| 8,176,083 B2 | 5/2012 | Vossen et al. | |
| 8,204,809 B1 * | 6/2012 | Wise | G06Q 40/00 705/35 |
| 8,612,582 B2 | 12/2013 | Dare et al. | |
| 8,793,753 B2 * | 7/2014 | Bhogal | H04N 21/4147 725/118 |
| 8,843,385 B2 | 9/2014 | Jurca et al. | |
| 2001/0013030 A1 | 8/2001 | Colby et al. | |
| 2002/0065752 A1 | 5/2002 | Lewis | |
| 2002/0065879 A1 * | 5/2002 | Ambrose | G06F 9/50 709/203 |
| 2002/0091539 A1 * | 7/2002 | Yin | G06Q 10/0639 705/7.38 |
| 2002/0128938 A1 * | 9/2002 | Schofield | G06Q 30/06 705/35 |
| 2002/0147726 A1 * | 10/2002 | Yehia | G06Q 10/10 |
| 2002/0147815 A1 | 10/2002 | Tormasov et al. | |
| 2002/0169777 A1 | 11/2002 | Balajel et al. | |
| 2003/0036683 A1 * | 2/2003 | Kehr | G06F 19/325 600/300 |
| 2004/0006506 A1 | 1/2004 | Hoang | |
| 2004/0034699 A1 | 2/2004 | Gotz et al. | |
| 2004/0107125 A1 * | 6/2004 | Guheen | G06Q 99/00 705/319 |
| 2004/0167789 A1 * | 8/2004 | Roberts | G06Q 30/0283 705/400 |
| 2004/0172374 A1 | 9/2004 | Forman | |
| 2004/0220790 A1 | 11/2004 | Cullick et al. | |
| 2005/0096950 A1 | 5/2005 | Caplan et al. | |
| 2005/0096963 A1 * | 5/2005 | Myr | G06Q 10/06375 705/7.35 |
| 2005/0108043 A1 | 5/2005 | Davidson | |
| 2005/0279824 A1 | 12/2005 | Anderson et al. | |
| 2006/0059054 A1 | 3/2006 | Adiseshan | |
| 2007/0067297 A1 | 3/2007 | Kublickis | |
| 2007/0091874 A1 | 4/2007 | Rockel et al. | |
| 2007/0243887 A1 | 10/2007 | Bandhole et al. | |
| 2008/0071561 A1 | 3/2008 | Holcombe | |
| 2008/0133324 A1 | 6/2008 | Jackson et al. | |
| 2008/0154625 A1 * | 6/2008 | Serbanescu | G06Q 30/0601 705/26.1 |
| 2008/0270256 A1 | 10/2008 | Caballero et al. | |
| 2008/0288889 A1 | 11/2008 | Hunt et al. | |
| 2009/0024543 A1 * | 1/2009 | Horowitz | G06Q 30/0283 705/400 |
| 2009/0163183 A1 | 6/2009 | O'Donoghue | |
| 2009/0234710 A1 | 9/2009 | Hassine et al. | |
| 2009/0240551 A1 * | 9/2009 | Writz | G06Q 10/063112 705/7.14 |
| 2009/0240586 A1 | 9/2009 | Ramer et al. | |
| 2010/0010967 A1 | 1/2010 | Muller | |
| 2010/0088155 A1 | 4/2010 | Pyle et al. | |
| 2010/0121830 A1 * | 5/2010 | Berry | G06Q 10/10 707/703 |
| 2010/0218104 A1 | 8/2010 | Lewis | |
| 2010/0318451 A1 | 12/2010 | Niccolini et al. | |
| 2011/0238948 A1 | 9/2011 | Vorbach et al. | |
| 2011/0246254 A1 | 10/2011 | Johnson et al. | |
| 2011/0295722 A1 | 12/2011 | Reisman | |
| 2012/0032945 A1 | 2/2012 | Dare et al. | |
| 2012/0197686 A1 * | 8/2012 | Abu El Ata | G06Q 10/06393 705/7.39 |
| 2013/0024342 A1 * | 1/2013 | Horowitz | G06Q 40/00 705/35 |
| 2013/0035992 A1 * | 2/2013 | Silverman | G06Q 30/0233 705/14.1 |
| 2013/0211986 A1 | 8/2013 | DeBie et al. | |
| 2013/0268437 A1 | 10/2013 | Desai et al. | |
| 2013/0339088 A1 | 12/2013 | Olsen et al. | |
| 2014/0114709 A1 | 4/2014 | Olsen et al. | |
| 2014/0114818 A1 | 4/2014 | Olsen et al. | |
| 2014/0114819 A1 | 4/2014 | Olsen et al. | |
| 2014/0122176 A1 | 5/2014 | Olsen et al. | |
| 2014/0122240 A1 | 5/2014 | Olsen et al. | |
| 2014/0156343 A1 | 6/2014 | Olsen et al. | |

OTHER PUBLICATIONS

Zorrilla, Marta, and Diego Garcia-Saiz. "A service oriented architecture to provide data mining services for non-expert data miners." Decision Support Systems 55.1 (2013): 399-411.*

Jones, Z., et al. "Design of a pulse oximeter for price sensitive emerging markets." 2010 Annual International Conference of the IEEE Engineering in Medicine and Biology. IEEE, 2010.*

Aldana, Walter Alberto. Data mining industry: emerging trends and new opportunities. Diss. Massachusetts Institute of Technology, Dept. of Electrical Engineering and Computer Science, 2000.*

Power, Daniel J., and Ramesh Sharda. "Model-driven decision support systems: Concepts and research directions." Decision Support Systems43.3 (2007): 1044-1061.*

Tounsi, Mohamed Ilyes. Application and Survey of Business Intelligence (BI) Tools within the Context of Military Decision Making. Diss. Monterey, California. Naval Postgraduate School, 2012.*

Gurău, Călin, and Ashok Ranchhod. "Measuring customer satisfaction: a platform for calculating, predicting and increasing customer profitability."Journal of Targeting, Measurement and Analysis for Marketing 10.3 (2002): 203-219.*

Brockmann, Carsten, and Norbert Gronau. "Business models of ERP system providers." AMCIS 2009 Proceedings (2009): 582.*

ServiceSource Launches eCommerce Cloud Application. *ServiceSource.* Mar. 18, 2011. [online]. Retrieved on May 18, 2014. Retrieved from the internet <http://files.shareholdercom/downloads/ABEA-5LUUYL/3185849553x0x469467/674f7951-83ba-4692-97bd-3efbc99b32b4/SREV_News_2011_5_17_General_Releases.pdf>.

* cited by examiner

FIG. 15

VISUAL REPRESENTATIONS OF RECURRING REVENUE MANAGEMENT SYSTEM DATA AND PREDICTIONS

CROSS-REFERENCE TO RELATED APPLICATION

This application is a continuation-in-part of the following co-pending patent applications: U.S. patent application Ser. No. 13/841,681, filed Mar. 15, 2013, entitled "Asset Data Model For Recurring Revenue Asset Management;" U.S. patent application Ser. No. 13/844,306, filed Mar. 15, 2013, entitled "Predictive Model Of Recurring Revenue Opportunities;" U.S. patent application Ser. No. 13/844,002, filed Mar. 15, 2013, entitled "Recurring Revenue Asset Sales Opportunity Generation;" U.S. patent application Ser. No. 13/842,035, filed Mar. 15, 2013, entitled "Provenance Tracking And Quality Analysis For Revenue Asset Management Data;" and U.S. patent application Ser. No. 13/842,398, filed Mar. 15, 2013, entitled "Inbound And Outbound Data Handling For Recurring Revenue Asset Management;" all five of which claim priority under 35 U.S.C. §119(e) to U.S. Provisional Patent Application Ser. No. 61/661,299, filed Jun. 18, 2012 and entitled "Recurring Revenue Asset Management System and Method." This application is also related to the following co-pending and co-owned applications: U.S. patent application Ser. No. 13/895,276, filed May 15, 2013, entitled "Multi-Tier Channel Partner Management For Recurring Revenue Sales;" and U.S. patent application Ser. No. 13/895,294, filed May 15, 2013, entitled "Recurring Revenue Management Benchmarking." The disclosure of each document identified in this paragraph is incorporated by reference herein in its entirety.

TECHNICAL FIELD

The subject matter described herein relates to data processing and management, and more particularly to processing and managing recurring revenue asset information, for example in support of sales execution and opportunity management for recurring revenue streams, and for generating a visual representation of recurring revenue management system data and predictions.

BACKGROUND

Innovations in products or marketing, the introduction of new or improved products, sales to new customers or additional sales to existing customers, and other approaches to expanding the amount of market share controlled by a company or other commercial entity have historically been primary drivers for revenue growth. However, as markets mature and consolidate, a larger fraction of revenue realized by a commercial entity (used herein to refer broadly to a company, corporation, organization, person, group of persons, or the like that undertakes commercial activity, including but not limited to sales of products and/or services to customers) may be derived from renewals of recurring revenue assets. As used herein, a recurring revenue asset can generally refer to one or more of maintenance and/or support agreements for software or hardware, service covered products, service contracts, subscription agreements, warranties, renewables, or the like.

Many commercial entities fail to maximize realization of revenue from recurring revenue assets at least in part because management of such assets is not well supported by currently available approaches. Currently available tools for managing recurring revenue are spread across customer relationship management (CRM) systems, partner relationship management (PRM) systems, data warehouses, entitlement systems, billing systems, and even spreadsheets or the like. However, recurring revenue management presents a number of challenges that differ in substantial and important ways from the typical focus of the sales staff of a commercial entity.

A typical sales process involves closing a sale or deal and moving on to a next customer. In contrast, a recurring revenue relationship is by definition repetitive, and is not efficiently tracked or managed by tools designed to support initial sales. In addition, the commercial entity's existing investments in sales personnel, sales processes, and information systems are typically directed to, and are optimized and supported with appropriate technology for, achieving maximum revenue performance in the product or services sales business, not the management of recurring revenue streams and the sales activities necessary to ensure that recurring revenue assets are maintained and even increased in value. Optimizing the recurring revenue such as service contracts and other service assets requires resolving challenges that span multiple areas of a company's operations. In today's ever-changing market landscape, service revenues have become integrally related to the success of a commercial entity. The problem, however, is that as commercial entities begin to recognize the need for this updated focus, they run into a host of challenges for which they are not prepared.

For example, a company often has to deal with fragmented data from disparate sources, and this data can be inaccurate, incomplete and sometimes duplicated, particularly in a sales channel or when selling through the channel. Further, in the case of a merger or acquisition, various legacy systems lead to complexity. Another challenge is a lack of specialization toward service contracts or service renewals. Most company data is centered on the products it sells, rather than the services contracted post sale of those products. A lack of industry focus on recurring service revenue has lead to a dearth of standard metrics and proven best practices.

Previously available approaches to recurring revenue management have not included a unified repository, or even any other way of collecting and organizing these types of information that are important to optimizing recurring revenue sales, that integrates data from multiple, disparate external client systems in support of an asset data model capable of resolving the key questions of what (e.g. services, serviceable products, etc.) has been purchased, who (e.g. which commercial entity) made the purchase or purchases, who is the end user of the purchased services or serviceable products, where are the purchased services or serviceable products being used, how are the purchased services or serviceable products being used, how satisfied is the end user (and optionally others at the commercial entity) with the purchased services or serviceable products, where are other opportunities for sales of additional related or unrelated services to the commercial entity as a result of the sale of the purchased services or serviceable products, and the like. Furthermore, software systems to automate and optimize the recurring revenue market have generally been limited in regards to analytics specific and relevant to recurring revenue assets, well-developed key performance indicators (KPIs) for management of such assets, the ability to acquire and aggregate the data streams, and other useful features that support optimization of recurring revenue sales and renewals.

Additionally, prior art approaches to recurring revenue asset management have generally lacked user interface features that provide the most relevant data or information to a user to assist in optimizing recurring revenue asset sales.

SUMMARY

Consistent with one or more aspects of the current subject matter, a recurring revenue repository can be maintained with recurring revenue information obtained from one or more external data sources as wells from ongoing sales activities (e.g. user interaction and updating of the database). Some aspects of the current subject mater can include use of a recurring revenue asset data model generated from at least a portion of this recurring revenue information. The recurring revenue asset data model can represent relationships among recurring revenue assets and organizations, previously sold products underlying the recurring revenue assets, people and products associated with the recurring revenue assets and the underlying previously sold products, and the like. A number of analytics and business intelligence processes can optionally be executed on the recurring revenue asset data model and on the recurring revenue information in the recurring revenue repository.

In some aspects of the current subject matter, a method includes generating a user interface for an electronic display. The user interface includes a graphical representation of one or more recurring revenue assets, the graphical representation representing each of the one or more recurring revenue assets according to one or more metrics that define each of the one or more recurring revenue assets. The method further includes calculating a predicted outcome for at least one of the one or more recurring revenue assets, the calculating being from a predictive model that is based on aggregate historical information collected from one or more data sources. The method further includes generating, for concurrent display in the user interface with the graphical representation of one or more recurring revenue assets, a graphical representation of the predicted outcome according to one or more parameters related to the one or more metrics.

Implementations of the current subject matter can include, but are not limited to, systems and methods including one or more features as described herein as well as articles that comprise a tangibly embodied machine-readable medium operable to cause one or more machines (e.g., computers, etc.) to result in operations consistent with these features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 15:
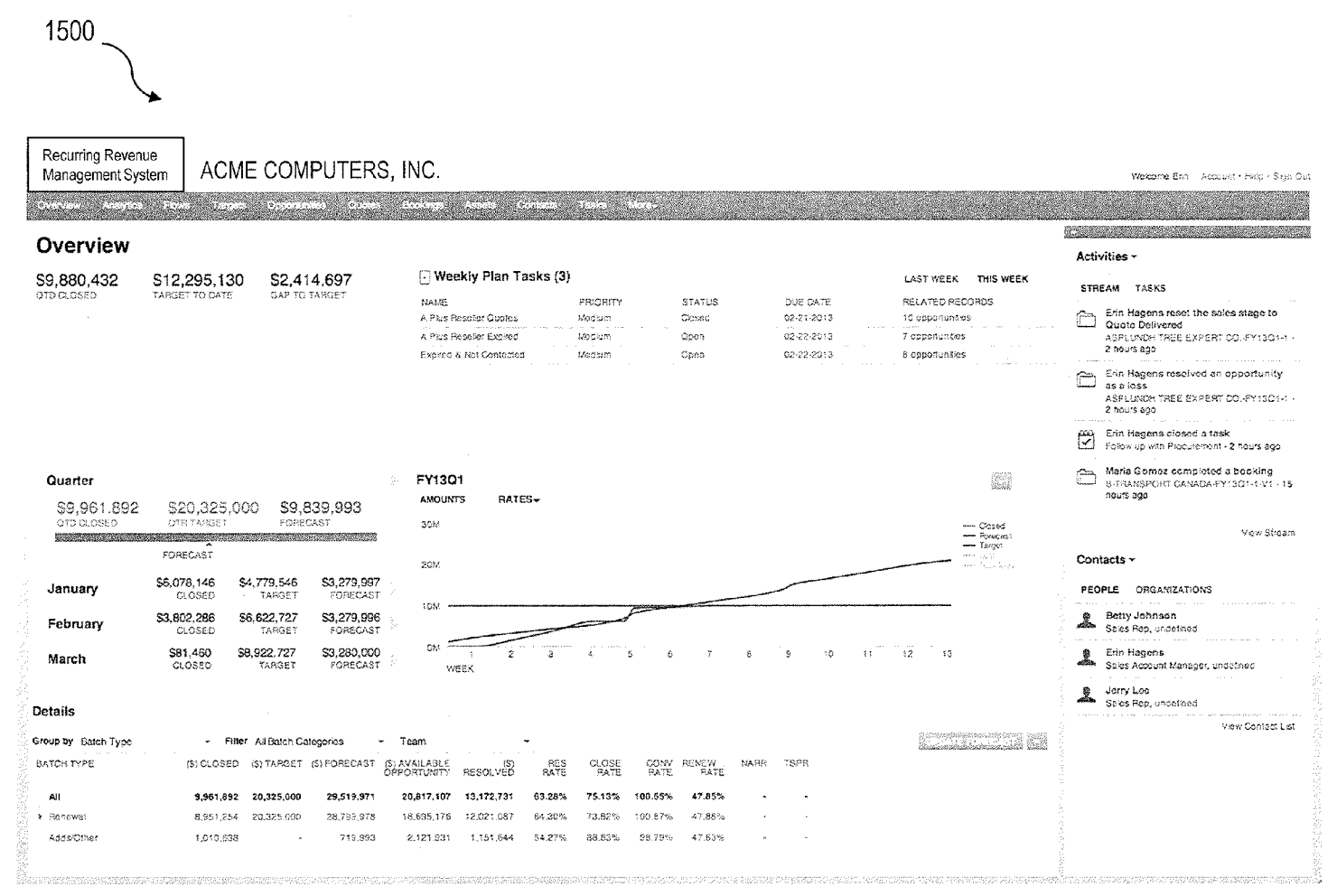

FIG. 13, FIG. 14, FIG. 15, and FIG. 16 show screenshot views of focused views that can be displayed to sales representatives, sales operations team members, and managers, respectively, consistent with implementations of the current subject matter;

FIG. 16, FIG. 17, FIG. 18, and FIG. 19 show screenshot views of analytics screens relating to different metrics or forecasts consistent with implementations of the current subject matter.

When practical, similar reference numbers denote similar structures, features, or elements.

DETAILED DESCRIPTION

This document describes recurring revenue management systems and methods, techniques, etc. relating to operations and functionality in support of recurring revenue management. Consistent with implementations of the current subject matter, a recurring revenue management system can include a recurring revenue assets repository that stores data relating to recurring revenue assets, which are discussed in greater detail below. A unified data store model can be provided to manage both transactional and analytical uses of data. In some implementations of the current subject matter, the use of dynamically generated and updated in-memory data structures (including but not limited to data cubes and the like) can facilitate rich analytical exploration of data in near real-time, thereby allowing adaptation to customer-specific dimensions and metrics. In some implementations of the current subject matter, an analytics framework supports role-specific dashboards, and a plug-in model with rich representational state transfer (REST) application programming interfaces (APIs) can be included to support use of third-party ad hoc analytics products. Also consistent with implementations of the current subject matter, data maintained in the recurring revenue management system can be organized according to an asset data model that includes data objects and defined or derived relationships between these data objects. The data objects can be representative of products sold by a commercial entity; recurring revenue assets of that commercial entity; opportunities for sale or renewal of new or existing recurring revenue assets; and contacts related to one or more of the products, recurring revenue assets, opportunities, and other contacts.

Figure 1:
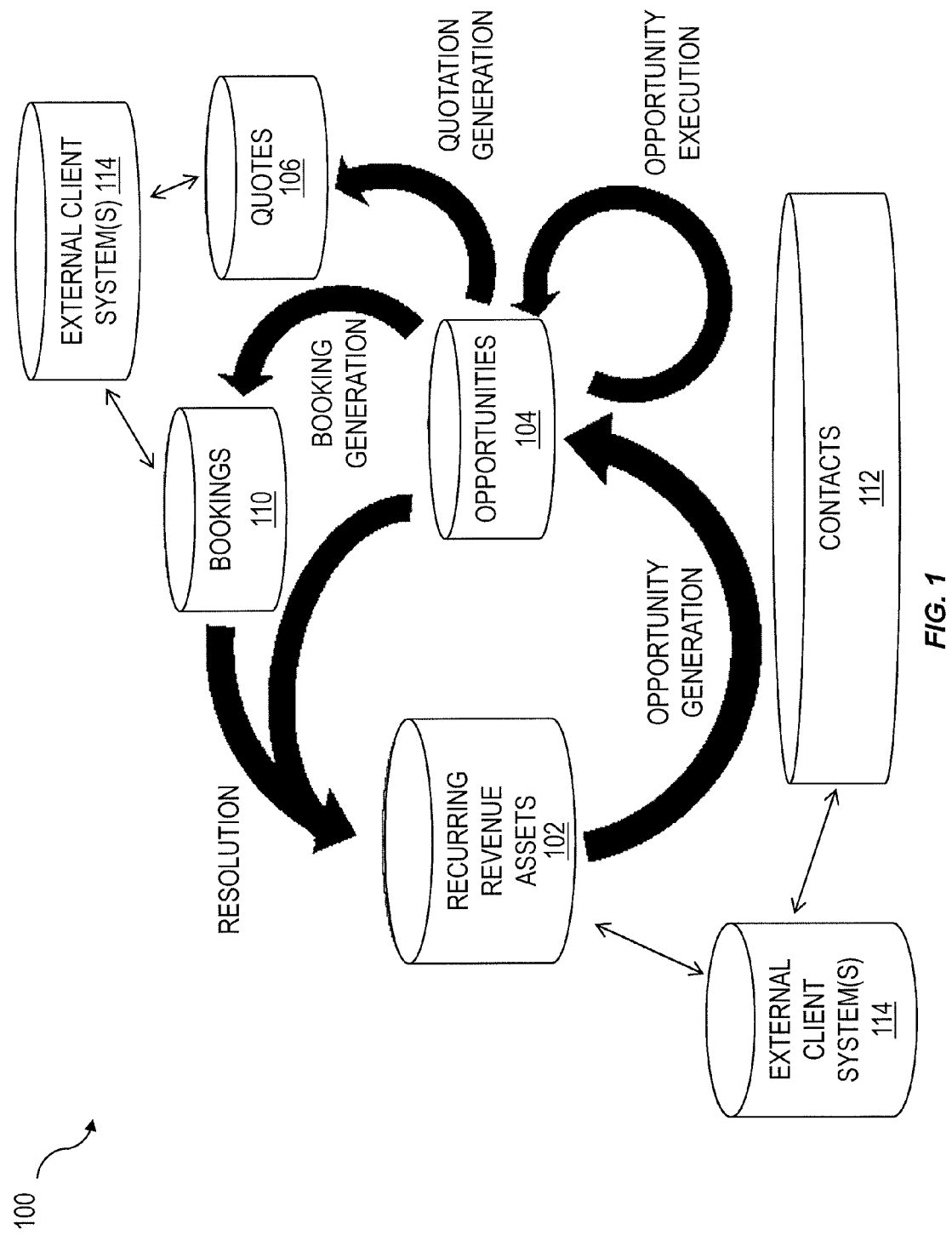
FIG. 1 shows a diagram illustrating data flows in a recurring revenue management framework consistent with implementations of the current subject matter.

FIG. 1 shows a diagram 100 showing data flows occurring in a recurring revenue management system consistent with implementations of the current subject matter. As shown in FIG. 1, multiple data sources can contribute data that are included within an asset data model, which can include recurring revenue assets information in a recurring revenue assets repository 102, opportunity and/or offer information in an opportunities repository 104, quotation information in a quotations repository 106, bookings information in a bookings repository 110, contacts information in a contacts repository 112, and the like. It should be noted that while various repositories in FIG. 1 are depicted as physically separate from one another, any data storage configuration and arrangement of one or more repositories is within the scope of the current subject matter. For example, all or some of the repositories 102, 104, 106, 110, 112 in FIG. 1 can be included within a single repository structure, which can be hosted at a single storage facility or alternatively in distributed storage (e.g. in the "cloud").

Referring again to FIG. 1, the recurring revenue assets repository 102 can include information about instances of covered assets (e.g. products such as physical items or software licenses, etc. that can be sold by a commercial entity to one or more customers of the commercial entity, which are also referred to herein as covered assets) that have been sold. These covered assets form the basis for recurring revenue assets because they constitute an existing instance of a seller-purchaser relationship between the commercial entity and the customer who purchased the covered assets. The recurring revenue assets (service assets) themselves can include, among other assets, service contracts, warranties, maintenance agreements, and the like sold by the commercial entity to the customer in association with or to provide an ongoing service arrangement for the covered assets.

Because it relates to an existing and ongoing relationship with the customer, the information about products and their associated recurring revenue assets that is contained in the recurring revenue assets repository 102 can be used to generate one or more opportunities for renewal of an existing recurring revenue asset (to thereby maintain the recurring revenue stream) and in some cases to increase the value of the recurring revenue asset (for example by selling a higher value agreement, service contract, etc. to the customer). As used herein, opportunities are groupings of offers targeted for execution of a sale to a customer, and offers are individual instances of a recurring revenue asset available for renewal. The groupings of offers in an opportunity can include multiple offer instances for the same customer. In some examples, the offers grouped into an opportunity can all have expiration dates during a sale period (e.g. a month, a quarter, a year, etc.). Opportunities can be collected in the opportunity repository 104.

Once acted upon by sales staff who make contact with appropriate decision makers at the customer, opportunities can be moved into a quotation stage during which quotations related to renewals, increases, etc. of existing recurring revenue assets can be generated. Quotations, which include a transaction offer for a set of offers included in an opportunity, can be stored in the quotation repository 106. As a quotation is transitioned to a deal being closed, a booking, which refers to a set of offers accepted by a customer, can be generated and stored in a bookings repository 110. Resolution of a booking results in generation of a new recurring revenue asset, which can be retained in the recurring revenue asset repository 102 for use in generating future offers and opportunities. For example, when a resolved service contract or the like approaches its next expiration, a new offer for renewal of that service contract can be generated and optionally grouped with other offers for the same customer with similarly timed expiration dates into a new opportunity. Additional data that impact the generation of opportunities and execution of those opportunities includes contact information for the decision makers and other important contacts (e.g. individuals and companies involved in the sales process) with whom sales staff need to communicate. This contact information can be stored in the contacts repository 112.

Efficient and structured assembly of the information contained in the repositories 102, 104, 106, 110, 112 depicted in FIG. 1 can be an important aspect of a recurring revenue management approach consistent with implementations of the current subject matter. However, much of this information is typically contained (or at least originates) in other data management systems (referred to herein as external client systems 114) than the recurring revenue management system, as discussed in greater detail below in reference to FIG. 2. The term "client" is used herein to refer to a commercial entity that employs features or functions of a recurring revenue management system provided or supported by a recurring revenue management vendor or service provider. Effectively, as used herein, the client is a commercial entity that is a customer of the recurring revenue management vendor or service provider. The client commercial entity in turn has customers to whom the client has sold and/or wishes to sell or renew recurring revenue assets such as those described elsewhere herein. A customer of a client commercial entity typically has an installed base of products, for which the customer can purchase various service agreements, contracts, etc. In effect, the products in the installed base of products can be considered as covered assets for which the commercial entity can sell to the customer one or more service contracts, agreements, etc. From the perspective of the client commercial entity, these service contracts, agreements, etc. can be considered to be service assets or recurring revenue assets.

A recurring revenue management approach consistent with implementations of the current subject matter can be configurable for the storage, retrieval, searching, and analysis of a wide range of recurring revenue information. Data relating to service assets or other recurring revenue assets, referred to herein as "recurring revenue data," can include information pertaining to what a commercial entity has sold, such as for example services, products for which related services can be sold, etc. (e.g. the covered assets). Recurring revenue data can also include information about the purchasers, users, locations of use, modes of use, etc. of such services, serviceable products, etc. In other words, the recurring revenue data can include information about what recurring revenue assets an entity has, who the customers and users of the recurring revenue assets are, and where and how the recurring revenue assets are being used. Recurring revenue data can further include metrics relating to satisfaction of the customer or user of the recurring revenue asset, as well as information relating to potential opportunities for services contract sales (e.g. for serviceable products soon to come off warranty, etc.), and the like.

The recurring revenue management system can import diverse information, and of various formats, from external client systems 114 into a common asset data model. The asset data model can facilitate a wide range of recurring revenue management capabilities, and can provide automated assistance for entity resolution (resolving external entities to pre-existing entities in the system). The recurring revenue management system can also optionally maintain provenance information for all information loaded into the system (e.g. all recurring revenue data from each of the one or more data sources) to be able to discern information origin.

Figure 2:
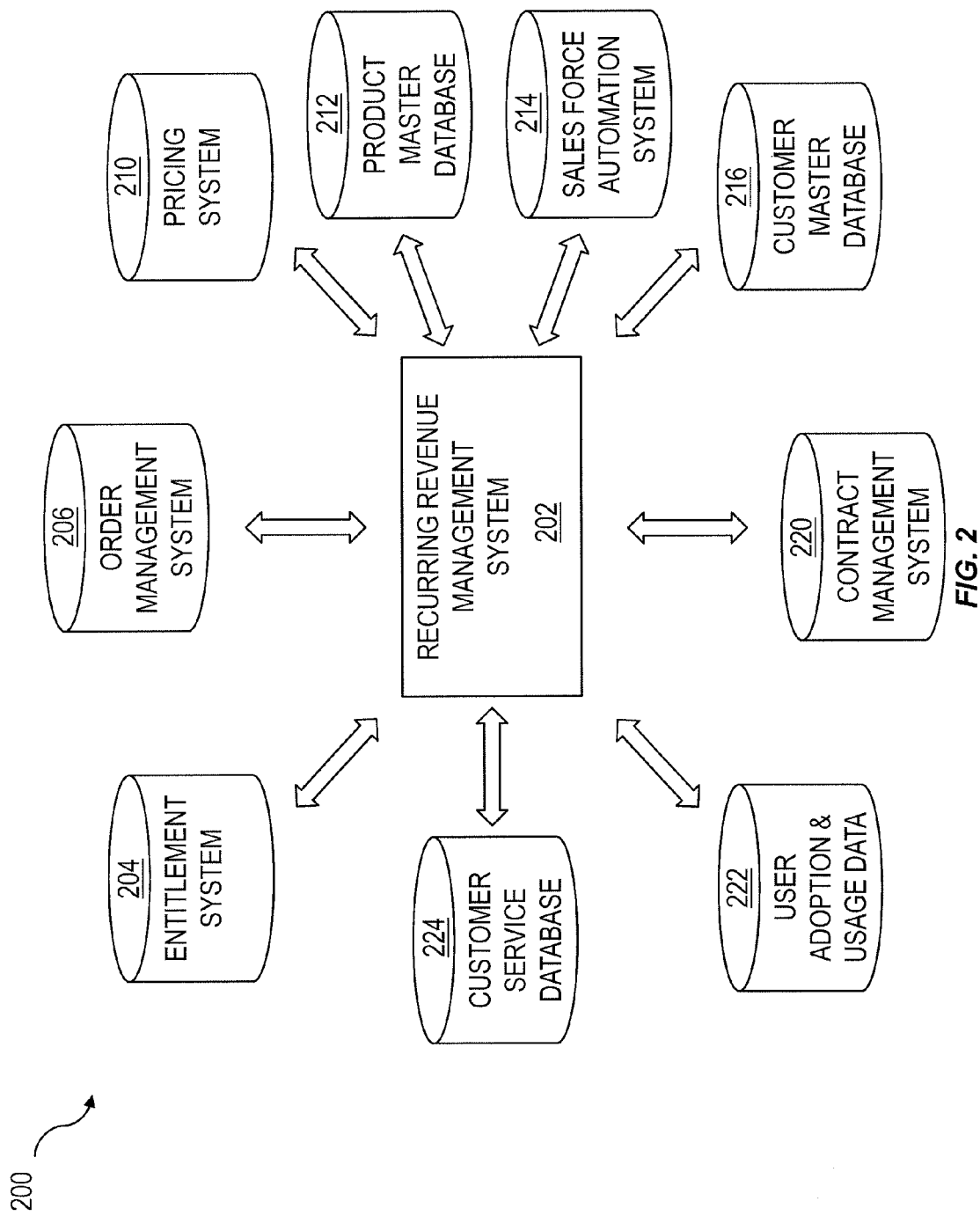
FIG. 2 shows a diagram showing data exchanges between a recurring revenue management system consistent with implementations of the current subject matter and examples of external client systems.

As noted above in reference to FIG. 1, a recurring revenue management system consistent with implementations of the current subject matter can receive and assign a usable structure to information obtained from a variety of external clients systems 114. FIG. 2 shows a diagram 200 illustrating potential sources of data or other information that can be acquired by or received at a recurring revenue management system 202. Among other possible data sources, the external client systems 114 referenced in FIG. 1 can include one or more of an entitlement system 204, an order management system 206, a pricing system 210, a product master database 212, a sales force automation system 214, a customer master database 216, a contract management system 220, user adoption and usage data sources 222, a customer service database 224, and the like. It will be understood that the individual external client systems shown in FIG. 2 can, in some implementations of the current subject matter, be provided by one or more systems that support features of more than one such external client system 114. For example, external client systems can include customer relationship management (CRM) systems, enterprise resource planning (ERP) systems, business intelligence (BI) systems, calendar and contact systems or databases, customer service systems, inventory systems, accounts receivable systems, sources of customer usage and engagement information, and the like. In general, a commercial entity acquires these various systems, databases, and the like from more than one different software or computing system provider, each of which typically uses distinct or proprietary database structures, data formats, report configurations, application programming interfaces (APIs), and the like that are optimized for the specific tasks to be performed by its product. Assembly of information from a group of data sources with multiple, potentially disparate database structures and data formats can present a challenge for any system that seeks to collect such information, present it in a usable format, support detailed analytics based on the data, etc. Further challenges can be presented by the need to authenticate potentially conflicting information received from more than one source. Additionally, information collected in a recurring revenue management system consistent with implementations of the current subject matter is typically not static. Rather, users interacting with the system are likely to update or correct the information based on communications with contacts, etc. Execution of tasks depicted in FIG. 1 can also alter the "correct" version of some of the information received into the recurring revenue management system.

An approach to this problem typically involves receipt of the data at the recipient system from a source system, creation of customized mappings (or application of pre-created mappings) between data structures of each source system and the data structures of the recipient system, and transformation of the data from the source system data structures to the recipient system data structures according to the mappings. Subsequent to import of data from the data sources but prior to making the imported data available for productive use by end users at the recipient system, one or more quality control operations generally occur to ensure consistency of the imported data; to identify duplicate and potentially conflicting records; and to alert one or more users with appropriate permissions levels to the presence of any errors, partial imports, missing data, or the like. For export of data from the recipient system back to the source system, a similar process can be undertaken, with the mapping being performed in reverse.

For an active recurring revenue management system, particularly one supporting recurring revenue asset management for a large commercial entity with a sizable sales staff, a large number of recurring revenue assets, and a complicated information landscape in which multiple systems maintain data records relevant to support of recurring revenue management activities, a quality control process that interrupts productive use of the system subsequent to a data import is not desirable. For example, in a large enterprise with multiple data streams, quality control could be quite time consuming. Additionally, in the interest of having the most current information available for use by the recurring revenue management system, frequent data imports can be advantageous. However, if each such import were to require substantial downtime for the import and transformation processes to complete and quality assurance routines to execute, usability of features supported by the recurring revenue management system would be negatively impacted.

A recurring revenue management approach consistent with implementations of the current subject matter can include synchronization and integration of data with a variety of disparate external client systems. For example a recurring revenue management system can access data records and formatted data from systems such as entitlement systems, order management systems, customer master systems, product master systems, and service delivery systems. The data from these external client systems is usually not static. Accordingly, it is advantageous for the recurring revenue management system to be able to receive data feeds from such systems at a high throughput rate. Furthermore, the received data is usable either upon receipt at the recurring revenue management system or at least within a very short processing time.

Figure 3:
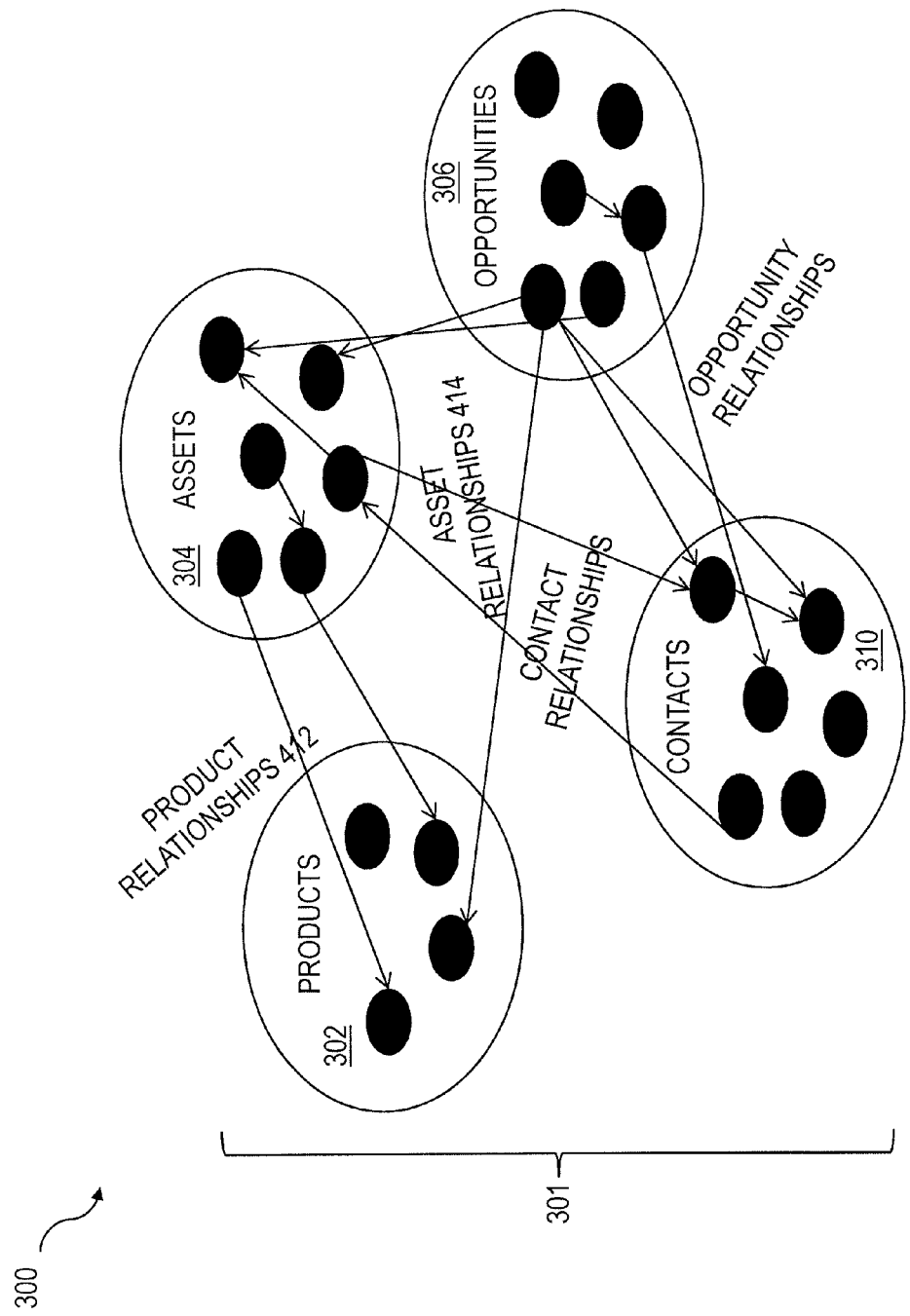
FIG. 3 shows a diagram illustrating features of an asset data model consistent with implementations of the current subject matter.

FIG. 3 illustrates features of a asset data model 300 that can include interrelated data objects 301 that support the recurring revenue management features and functions described elsewhere herein. The recurring revenue management system 302 can support an asset data model 300 as a flexible mechanism for representing complex relationships among assets, organizations, people, and products, and on which a number of analytics and business intelligence processes can be executed. The recurring revenue management system can provide one or more application programming interfaces (APIs) or other standardized interface to access service renewal assets in the recurring revenue repository, and the recurring revenue repository information model used by the repository provides a uniform means of analyzing, searching, and manipulating recurring revenue data.

Consistent with implementations of the current subject matter, a recurring revenue management system 202 and an included asset data model 300 can include product data objects 302, recurring revenue asset data objects 304, opportunity data objects 306, and contact data objects 310. Product data objects 302 represent products (e.g. covered assets), which as noted above in reference to FIG. 1, can include items sold to customers and can be considered as part of the customer's installed base of covered assets. A framework of data objects 301 can include a set of common relationships related to recurring revenue management, these relationships can include product relationships 312, asset relationships 314, opportunity relationships 316, and contact relationships 320. Products can provide the basis for a recurring revenue assets represented by instances of asset data objects 304 via one or more product relationships 312 between a product represented by a product data object 302 and the instances of an asset data object 304 representing the recurring revenue asset or assets. Product relationships 312 can also optionally exist between product represented by a product data object 302 and one or more of recurring revenue assets represented by instances of asset data objects 304, opportunities represented by instances of opportunity data objects 306, contacts represented by instances of contact objects 310, other products represented by other instances of a product data object 302, etc.

Further with reference to FIG. 3, asset relationships 314 can exist between a recurring revenue asset represented by an instance of an asset data object 304 and one or more of a product represented by an instance of a product data object 302, a contact represented by an instance of a contact data object 310 (e.g. a person, organization, etc. relevant to a recurring revenue asset), an opportunity represented by an instance of an opportunity data object 306 (e.g. a bundle of offers relating to renewal of existing recurring revenue streams and/or to establishment of new or increased value recurring revenue streams), another recurring revenue asset represented by another instance of an asset data object 304, etc.

Opportunity relationships can exist between an opportunity represented by an instance of an opportunity data object 306 and one or more of a specific recurring revenue asset represented by an instance of an asset data objects 304, a product represented by an instance of a product data object 302 underlying the recurring revenue asset(s), a contact represented by another instance of a contact data objects 310, another opportunity represented an instance of an opportunity data object 306, etc. Contact relationships can exist between a contact represented by an instance of a contact data object 310 and one or more of a recurring revenue asset represented by an instance of an asset data object 304 (for example based on communications relating to an initial sale of a recurring revenue asset 304 and/or to one or more renewals of the recurring revenue asset 304), a product represented by an instance of a product data object 302 underlying the recurring revenue asset(s), an opportunity represented by an instance of an opportunity data object 306, another contact represented by another instance of a contact data object 310, etc.

The data objects 108 discussed above can optionally also be extendible, for example through customer-specific extensions fields. Additional custom objects can be added to a customer's configuration. In addition, the set of base relationships can be extended to match specific requirements of the commercial entity using the recurring revenue management system 202. Relationships between an instance of the product data object 302, the asset data object 304, the opportunity data object, and the contact data object can be established based on one or more of the data received from the incoming data streams, existing data in the recurring revenue management system 202, user input, and the like. The instances of the data objects 301 and the defined relationships between these instances together make up the asset data model 300.

An asset data model 300 such as that described herein can provide a useful vehicle for exploring and understanding relationships that exist among product objects, asset objects, organization objects, contact objects, and opportunity objects. Many of these relationships are directly derived from information that exists in source client systems, while others require inference on the part of the system, others are generated by the system as part of object generation, others are created as a side effect of system actions, and still others are constructed as a result of actions by system users. In an illustrative but not limiting example of an inference approach to generation of the relationships between objects, a relationship inference includes exploitation of transitivity (e.g. if a relates to b, and b relates to c, a relationship can be instantiated between a to c), and an automated instantiation of inverse relationships (if a relates to b, then there exists an inverse relationship from b to a).

A consistent approach to managing opportunities, quotes, and bookings activities can be provided through one or more features supported by an asset data model 300 consistent with implementations of the current subject matter. Such features can include, but are not limited to, detailed reports, pipeline dashboards, opportunity details, territory management, and the like. Detailed reports allow sales representatives to proactively identify and address at-risk opportunities, while pipeline dashboards allow managers to view pacing of sales activities by time period and production metrics. Opportunity details can allow viewing of deal progress and logged activities by sales representative, sales operations assistants, managers, and other staff. Territory management allows managers to manage and drive sales representatives' behavior by assigning tasks to opportunities based on existing priorities. Territory can refer to divisions of available opportunities based on one or more factors, which can include but are not limited to geography, customer groupings, subject matter, etc.

Through the asset data model 300, a clearer view can be presented to users (e.g. sales staff, sales support staff, managers, executives, etc.) of the installed base of products, services, etc. that have been previously sold to customers of the commercial entity and that provide the foundation for new and renewal sales of recurring revenue assets. As discussed elsewhere herein, the clearer view can be presented to users via one or more user interface displays, computer-generated interfaces, or the like. Management of this installed base using an asset data model 300 can improve accuracy and insight into the customer base and enable leveraging of this installed base data to maximize recurring revenue streams. Increased sales can be achieved through improved quote accuracy, consolidation, identification of cross-sell and up-sell opportunities, better handling of renewal contacts and processes, and the like. Service delivery efficiency and customer satisfaction can be increased through improved entitlement, shipping, and staffing resource planning. Prediction of customer behavior can also improve, which can facilitate optimization of sales staff activities.

Among other information that can be received in the inbound data streams and incorporated into appropriate instances of data objects 301 in the asset data model 300, the asset data model can store and organize expiration information for existing recurring revenue assets, product information (e.g. characterizations of the install base including who, what, where, etc. information), relationships (e.g. predecessors, successors, associated opportunities, covered products, customers, partners, locations, etc.), expected value analyses (e.g. projected future revenue, product margin analyses, etc.), and the like.

A recurring revenue management system including one or more features as described herein can provide a scenario-based revenue projection from the recurring revenue repository of service asset data and other recurring revenue data. In some implementations, the recurring revenue management system generates a user interface to display a projection of revenue over time from a set of assets based on expiration dates, product information, projected sales timing, and projected sales effectiveness.

A recurring revenue management system including one or more features as described herein can also receive input from a user to define patterns that, when applied to data of the recurring revenue repository, yield one or more sets of opportunities generated for sales execution. Logic of the recurring revenue management system includes an application that executes one or more methodologies to identify different classes of opportunities (e.g. renewal, cross-sell, up-sell, etc.) as well as optimizing offer grouping within opportunities to improve sales productivity. The recurring revenue management system can encode and automate computer-based processing for automated guidance of team-based selling of services (recurring revenue sales).

In various aspects consistent with one or more implementations of the current subject matter, recurring revenue sales execution can be supported by one or more of an opportunity generation and handling approach, forecasting and targeting approach, a sales-stage management approach, an integrated sales operations approach, a channel partner management approach, and sales automation approaches. In other aspects, one or more sales operations functions, such as for example quote processing, bookings processing, and data services, can also be provided. Various operations in support of such features can optionally be based at least in part on use of an asset data model 300 of a recurring revenue management system 202 as discussed above. It will be understood that while the approaches described herein make reference to various features and functions of an asset data model 300, the use of such a model is not mandatory unless otherwise so stated. The following description and the accompanying figures relate to various advantageous use features related to these aspects as well as technical features via which such use features can be provided.

Figure 4:
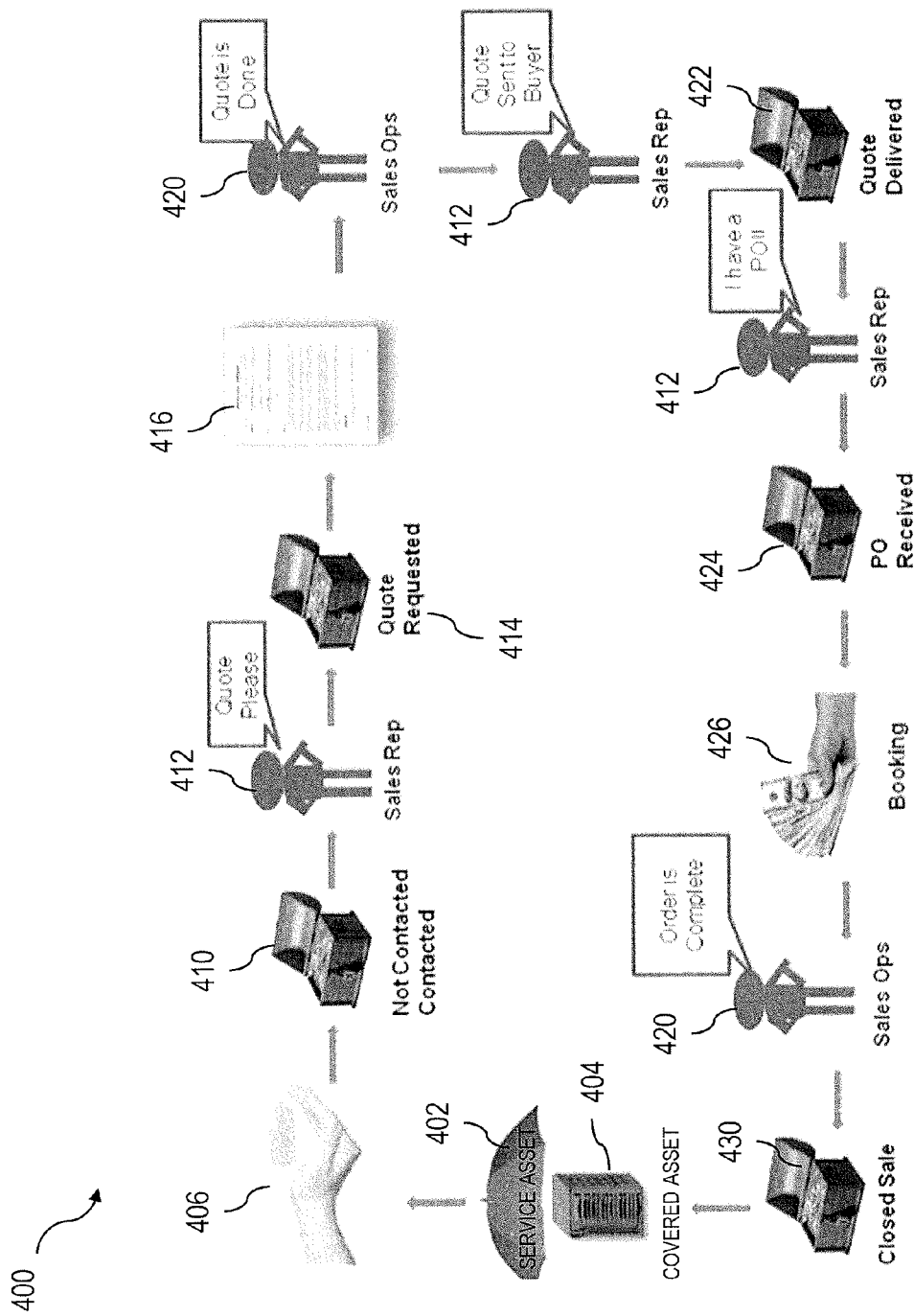
FIG. 4 shows a diagram illustrating relationships between components of a recurring revenue management framework consistent with implementations of the current subject matter.

FIG. 4 shows a diagram 400 illustrating components of a recurring revenue management approach that can be based on one or more features of a recurring revenue management system 202 and asset data model 300 such as those discussed above. The diagram 400 shows interaction of the various components within the context of a sales process for a service asset 402. The service asset 402 is related to a covered asset 404 that has been previously sold, leased, etc. to a customer by a commercial entity (in this example, the commercial entity is the user of a recurring revenue management system 202). An existing service asset 402 can have an expiration date. As that expiration data approaches, a recurring revenue management system 202 can generate an offer 406 based at least in part on data stored and organized in an asset data model 300 that defines relationships between data objects 301, for example data objects relating to products (e.g. covered assets 404), opportunities, contacts, service assets, etc. The offer 406 can optionally be one of a group of two or more offers that are grouped into an opportunity based on proximity of the expiration dates of two or more service assets relating to a same customer. The grouping of offers into opportunities can be performed intelligently based on the asset data model 300 and the relationships defined therein, for example, such that an opportunity groups offers that should be directed to a common decision maker at a single customer. The offer, optionally as part of an opportunity, can be initially classified as "not contacted" 410 during a qualification phase of opportunity processing. As a sales representative makes initial contact with a buyer or decision maker at the customer, the opportunity can be reclassified as "contacted."

Upon a sales representative making a successful contact with a buyer or other decision-maker at the customer, and upon identifying a desire on the part of the buyer or decision maker to explore renewing of the service asset 402, the sales representative 412 can request a quote 414 and this can be logged into the recurring revenue management system 202. A quotation record 416 can be generated and forwarded to a sales operations team member 420. When the sales operation team member 420 completes the quotation (and optionally logs this into the recurring revenue management system 202), the recurring revenue management system 202 can notify the sales representative 412 that the generated quote can be sent to the buyer. In optional variations, the recurring revenue management system 202 can automatically detect when a quotation has been completed, and can provide the notification to the sales representative 412 that this has occurred.

The sales representative 420 can deliver the quotation to the buyer or other decision maker 422, and this delivery event can also be recorded by the recurring revenue management system 202 as further tracking of the sales process. When the sales representative 412 logs into the recurring revenue management system 202 that a purchase order has been received, the sales process state can be updated accordingly 424. The recurring revenue management system 202 then generates a booking record 426. When the sales operation team member 420 records that the sale has been completed 430, the sales phase will move to closed sale. A next generation service asset can be generated, for example with another instance of an opportunity object 306 that has a relationship to the instance of the product object associated with the covered asset 404. This next generation service asset provides a starting point for a next offer to renew the service asset 402 as the next generation service asset approaches its expiration date.

The asset data model 300 can also support real-time (or at least nearly or approximately real-time) reporting and interpretation of service assets, installed base, total asset value, projected revenue, and data quality as well as subscriptions planning (e.g. evaluating, categorizing, and prioritizing subscriptions) to drive sales programs, opportunity generation (e.g. creating opportunities based on installed base or subscription planning outcomes. In this manner, the asset data model 300 can be used in generation of offers and opportunities, for example based on inter-data object relationships and information that can be included in or derived from the asset data model 300. This additional information can include, but is not limited to exclusion rules; expiration window filters; product, customer, or region filters; target selling periods, upsell and cross-sell opportunities, upgrade requirements, expected outcome analysis, and the like.

Figure 5:
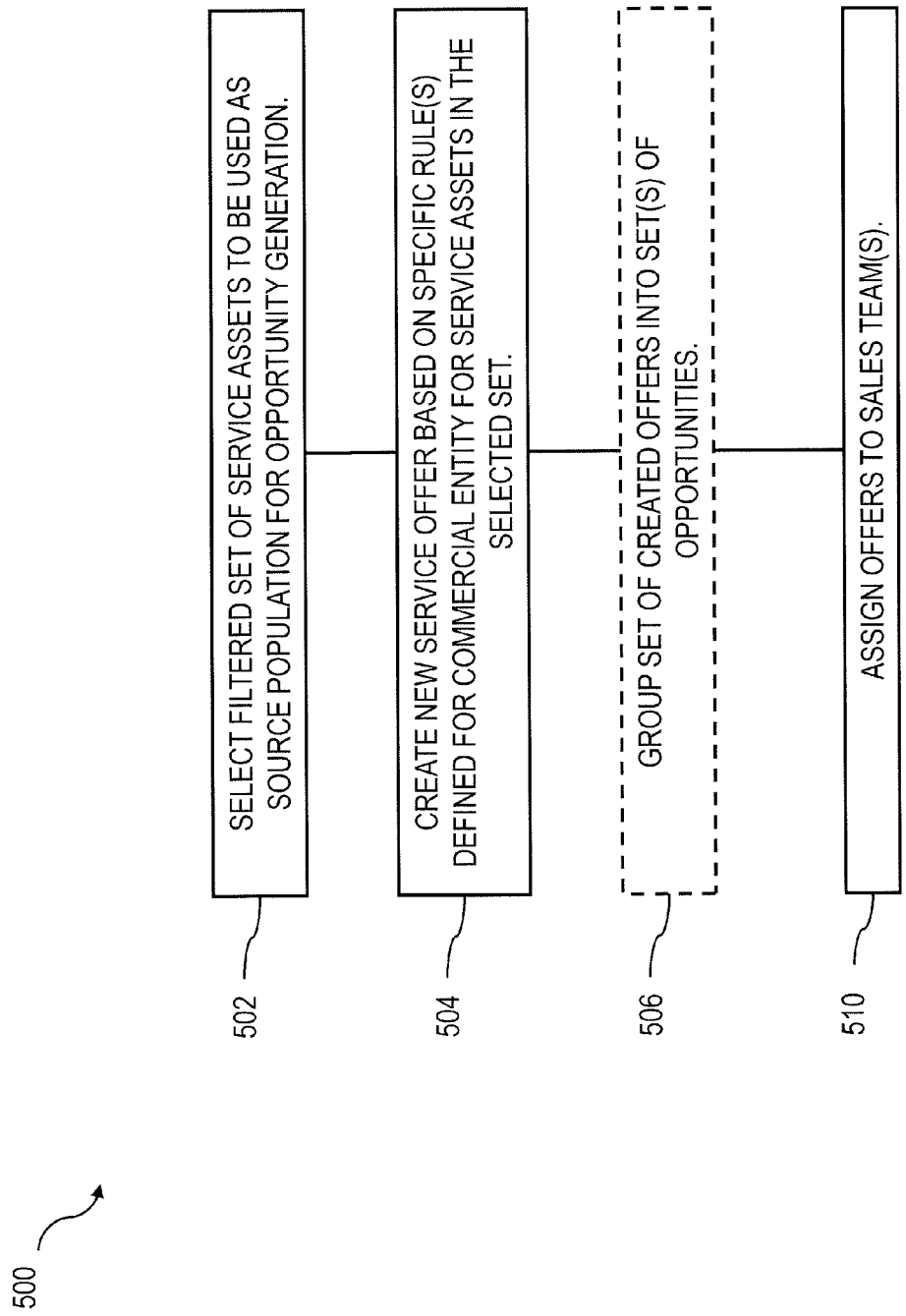
FIG. 5 shows a process flow chart illustrating features of a method consistent with implementations of the current subject matter.

An approach to opportunity generation and handling consistent with implementations of the current subject matter can be better understood in reference to FIG. 5. At any particular time, a user or an automated process can select a filtered set of service assets to be used as a source population for opportunity generation. Typically this filter can include a range for the expiration dates of the service contracts that corresponds to a targeted selling period (e.g. a time period in which new contract or renewal sales are expected to close). The expiration date range can typically include dates corresponding to one of expiration dates before the selling period (expired or carryover contracts), expiration dates during the selling period (in period), and expiration dates after the selling period (futures). Opportunity generation can be an automated process that operates on a selected set of service assets. An example of an opportunity generation approach can be better understood by reference to the process flow chart 500, which illustrates features of a method consistent with one or more implementations of the current subject matter.

At 502, the filtered set of service assets discussed above is selected. In various implementations of the current subject matter, the selecting of the filtered set of service assets can occur automatically, for example via a computing system applying one of the filters discussed above to an asset data model that includes a collection of data objects including asset data objects associated with service assets providing recurring revenue streams to a commercial entity. At 504, a new service offer based on one or more specific rules defined for the commercial entity is created for service assets in the selected set. The creating can optionally include applying one or more offer creation parameters. A non-limiting example of an offer creation parameter includes a type of renewal to be offered (e.g. a "like for like" service, which can also be referred to as a renewal par, an upgrade in service, etc.). The creating can also include looking up or otherwise determining an appropriate renewal stock-keeping unit (SKU) or other reference information for an expiring asset and a chosen service level, looking up or otherwise determining a price for new a new SKU or other reference information for a renewal of the expiring asset, copying relevant information from the expiring service asset (e.g. contact information, etc.), and the like. The relevant information can in some implementations be stored in an asset data object associated with the expiring service asset or in a contact data object having a relationship with the asset data object associated with the expiring service asset, or the like. The copying can include transferring the data from an asset data object associated with the expiring service asset to a new asset data object associated with the new service asset generated by a renewal, establishing a relationship between a contact data object having a relationship with the new asset data object associated with the new service asset generated by the renewal, or the like.

At 506, the set of created offers can optionally be grouped into two or more smaller sets of opportunities. The grouping of offers into smaller sets of opportunities can be performed to optimize sales efficiency. The grouping can in some examples involve associating offers for a same target customer, a same reseller organization, or the like. In additional or alternative variations, grouping can be based on other considerations, such as for example a same or related product type, etc. At 510, the offers, either as sets of opportunities or individually, can be assigned to one or more sales teams. The assigning can be based on data contained within the opportunity, for example in an opportunity data object associated with the opportunity. In further implementations of the current subject matter, opportunity generation can optionally include more complex logic to automatically add appropriate add-on services to the offers or to create offers corresponding to cross-sell opportunities.

Implementations of a recurring revenue management system include user interface features, implemented in an electronic graphical display, that provide the most relevant data or information to a user to assist in optimizing recurring revenue asset sales. In one example, the user interface can include a graphical feature that highlights or otherwise draws a user's attention to one or more opportunities, groups of opportunities, values of one or more metrics, or the like, based on predictive analysis. The user interface features provide real-time analytics, comparative benchmarking to management-generated goals or to predictive outcomes, and customizable forecasting based on the dynamic selection of one or more metrics or definition of one or more parameters related to a recurring revenue asset. The user interface generated by the recurring revenue management system can be customized for any type of electronic display device or dimensions and capabilities thereof.

In some implementations, a recurring revenue management system is configured for generating graphical representations of individual recurring revenue assets based on data attributes associated with those assets. The system is further configured for generating graphical representations of sets of recurring revenue assets that can be filtered or ordered based on data attributes associated with those assets. In some implementations, a recurring revenue management system is configured for generating graphical representations of information about sets of recurring revenue assets where—the sets can be defined by filters on asset data attributes—and the information is defined by one or more metrics that are defined by aggregate functions on attributes of recurring revenue assets in the set, and one or more attributes used as dimensions for metric grouping. The system can calculate predictive metrics or dimensions for recurring revenue assets based on aggregate historical information collected from one or more data sources.

In one implementation, renewal sales opportunities can be displayed concurrently with one or more predictions generated from one or more predictive models. Each of the one or more predictive models can be based on any number of metrics, and can function with additional capabilities beyond a simple ad hoc query tool. For example, intelligent sorting of the opportunities presented in the list of opportunities can highlight probable outcomes, and the like. The metrics that are displayed concurrently with the list of opportunities can be dynamically selected and changed for display in the user interface, to support the ability of a user to gain rapid insight into the sales activities or changes in sales activities that may be most useful in improving sales performance.

Implementations of the current subject matter can display a number of additional data sources or results derived from data sources that are highly relevant to recurring revenue asset sales success. For example a "days in advance" (DIA) metric, historically based metrics, and other metrics, etc. can be displayed in combination with sales/renewal opportunities. The DIA metric is related to a time period before expiration of a currently active service asset. The time period is preferably expressed in terms of days, but may also be expressed in terms of other time intervals such as weeks, months, quarters or any other time periods. The DIA metric can be used in predictive models to estimate an optimal timing relative to expiration of an existing service asset, to determine a time period in which contact with a customer is most likely to yield success in the recurring revenue asset sale.

In some implementations, a user interface can display information that both characterizes one or more sales opportunities, and characterizes one or more metrics that can be used in predicting the likelihood of a favorable outcome of any of the one or more sales opportunities. For example, the user interface can display a list that includes multiple (two or more) opportunities that are presented with ranking capabilities. The ranking capabilities can include rankings based on criteria such as distance from the expiration date or the like.

Additional features of implementations of the current subject matter include the ability to query and/or sort a list of opportunities based on one or more metrics that are used in a predictive model. For example, these metrics can include a length of time from first contact, a length of time for first quoting of an opportunity relative to a close date, a number of revised quotes delivered to a customer before closing, a meantime to complete a quote request, and the like.

A predictive model can also include the ability to diagnose problems that a sales organization, an individual salesperson, or any other individual or group of individuals may be experiencing that lead to less than optimal sales performance. A desired output of a predictive model can include a probability of a successful close of a renewal sales offer at any given time and or at any given current value compared with one or more metrics used in the predictive model.

Figure 6:
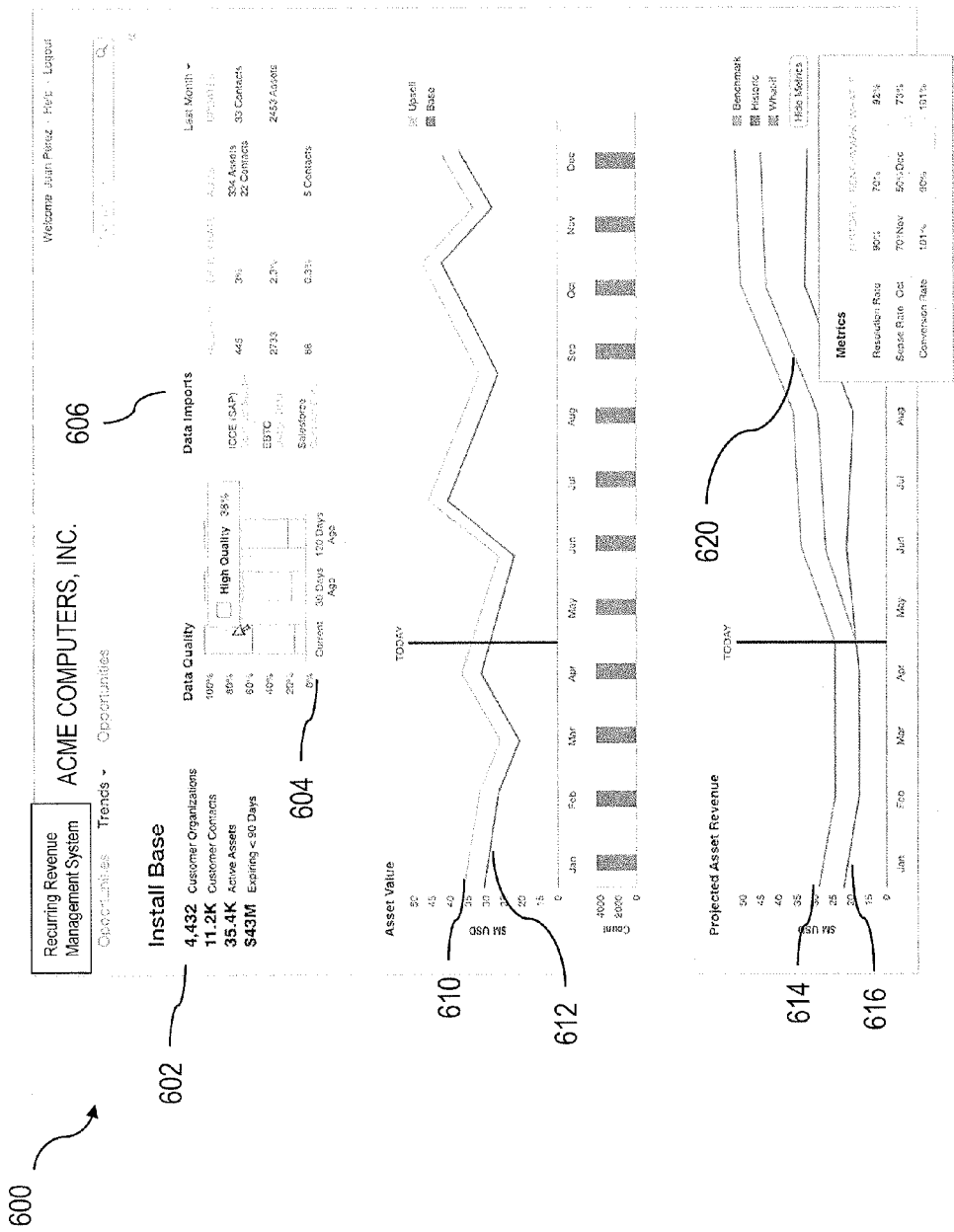
FIG. 6, FIG. 7, FIG. 8, and FIG. 9 show screenshot views of displays of analytical detail information consistent with implementations of the current subject matter.

Some implementations of the current subject matter can support understanding the distribution of expiring assets over time, for example as part of long range planning of potential future revenue. This functionality need not involve creation of opportunity objects. FIG. 6 shows an example screenshot view 600 illustrating a display of various analytics information that can be presented to a user based on information organized in an asset data model 300. The data displayed can optionally be dynamically updated to reflect an at least near real time view on the status of the install base 602, data quality 604, data import statistics 606, value of the recurring revenue asset stream (e.g. both assuming renewal of contracts at their existing value 610 and with some amount of upsell 612, projected service asset revenue (e.g. with projections for a benchmark amount 614, a historic trend 616, and a "what-if" or hypothetical prediction based on one or more user-configurable parameters 620). Dynamic data updating can be provided in some implementations of the current subject matter via a high-performance, in-memory database backend.

Figure 7:
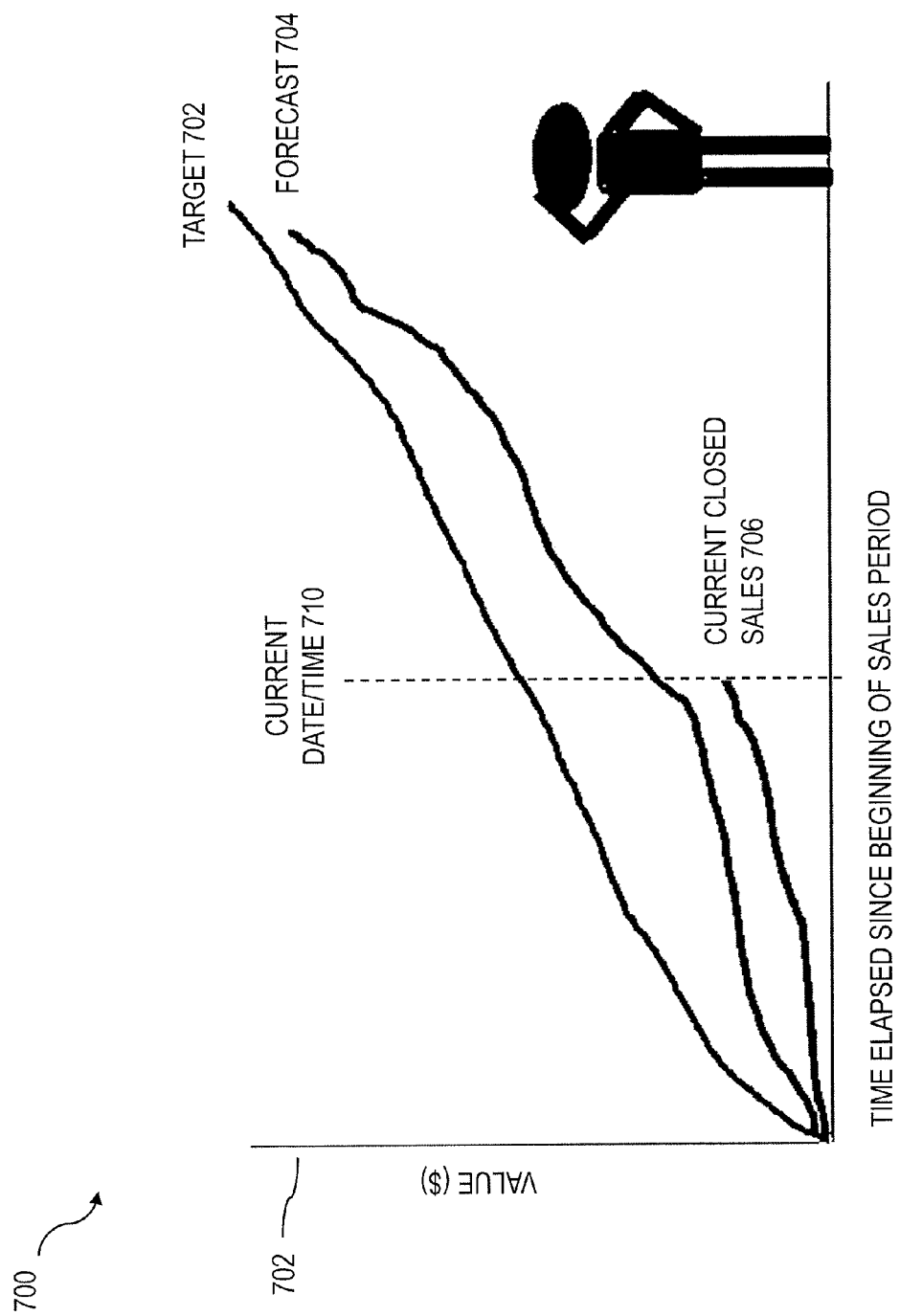

Consistent with implementations of the current subject matter, a combination top down, bottom up approach to predictions of recurring revenue from service assets can be supported by one or more of on-going availability of large streams of inbound data received from external client system 114; the ability to track, project, and analyze these data, and the like. In this approach, management personnel can set sales targets for a sales period (e.g. a month, a quarter, etc.), and sales operations team members and/or sales representatives (explained in more detail below) can generate updated forecasts, for example on a shorter timescale than the sales period (e.g. a day, a week, etc.). The term "target" as used herein can be considered as a business objective created via a top-down approach, such as a desired goal set by a manager, supervisor, division vice president, etc. for a given sales period. In contrast, a "forecast" as used herein can be a forward-looking projection created by a sales employee to indicate where that sales person expects his or her sales numbers to be by the end of the sales period. FIG. 7 shows a chart 700 illustrating the relationship between targets, forecasts, and "reality" as represented by current closed sales for a given sales period. In the example of FIG. 7, a target line 702 represents a "top-down" projection or expectation set by one or more managers or management/executive staff while a forecast line represents a "bottom-up" estimate generated by input from actual sales staff. The "current closed sales" line 706 represents actual sales results updated (at least approximately) to the current date and/or time 710. Comparison of these various metrics at various times, such as for example as the sales period progresses, at the end of the sales period, etc., can be useful in a number of analytical measures relating to sales performance. Examples of analytical measures that can be supported based on data collected, generated, etc. using approaches consistent with the current subject matter can include comparisons of sales performance versus one or more predefined metrics, benchmarking against data regarding other recurring revenue sales activities, etc. As explained in further detail below, the benchmarking can occur against internal data for a commercial entity, for example using the commercial entity's historical data as collected in an asset data model, etc. Alternatively or in addition, external benchmarking is also within the scope of the current subject matter.

Figure 8:
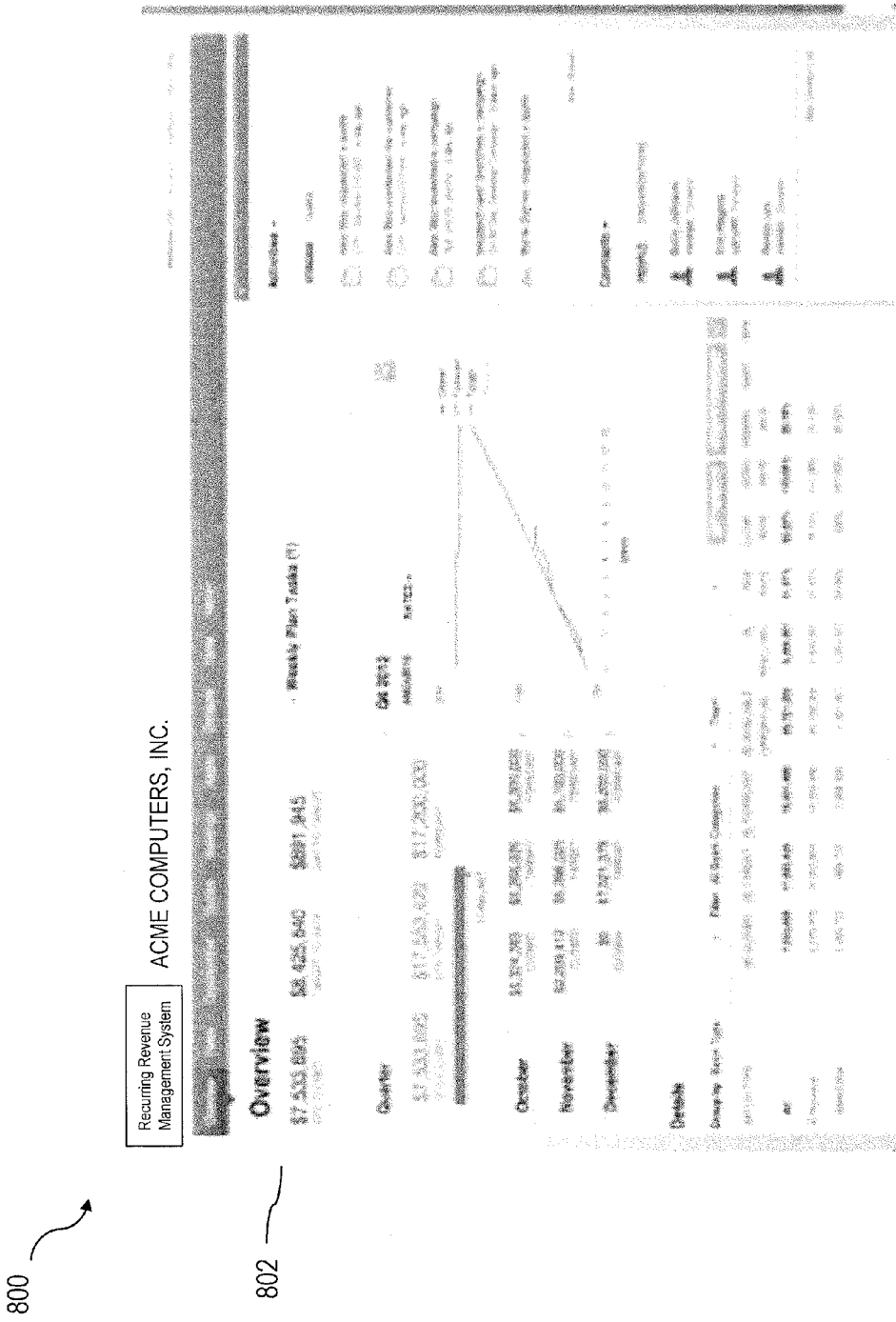

Another feature of a recurring revenue management system consistent with implementations of the current subject matter can involve support of timely and accurate analysis of how a sales history can drive future sales performance. Tools to assist with this effort can include dashboards and visualizations of analytical content such as graphs and charts that display immediately upon login; a rich query interface that can support set operations, aggregations, background processing, and materialized collections; either or both of standard and client-specific reports; and externally callable REST APIs that facilitate the use of third party data exploration and reporting tools. FIG. 8 shows a screenshot view 800 that illustrates an example of real time performance statistics reported by analytical tools embedded in a dashboard such as described herein. The dashboard shown in the view 800 can an overview tab or page as well as various tabs or pages linked from the overview that enable a deeper dive into the collected sales data to allow a user of the system to access data pertaining to one or more metrics or view on the sales data based on a user role. For example, a manager's view on the data, metrics, etc. can differ from that of a sales representative or sales operation team member. These details are discussed in greater detail below.

The available opportunity for a given sales period is generally defined as all opportunities expiring in the current sales period and any remaining unresolved opportunities from the previous sales period. Another aspect of recurring revenue management that can be supported using approaches consistent with the current subject matter involves dynamic calculation and real time or near real time updating of key performance indicator (KPI) metrics relating to sales performance and optimization of a recurring revenue stream. Among other questions that a sales team manager, other executive, etc. at a commercial entity may desire to have answered are how successful the sales team is at covering the customer base, how successful the sales team is at converting opportunities to a win, how successful the team is at upselling and cross selling, etc. Upselling generally involves closing an opportunity at an increase revenue point relative to the contract or other recurring revenue stream that was expiring. This can include selling a higher level of service, a maintenance or insurance plan with a lower deductible, etc.

Figure 9:
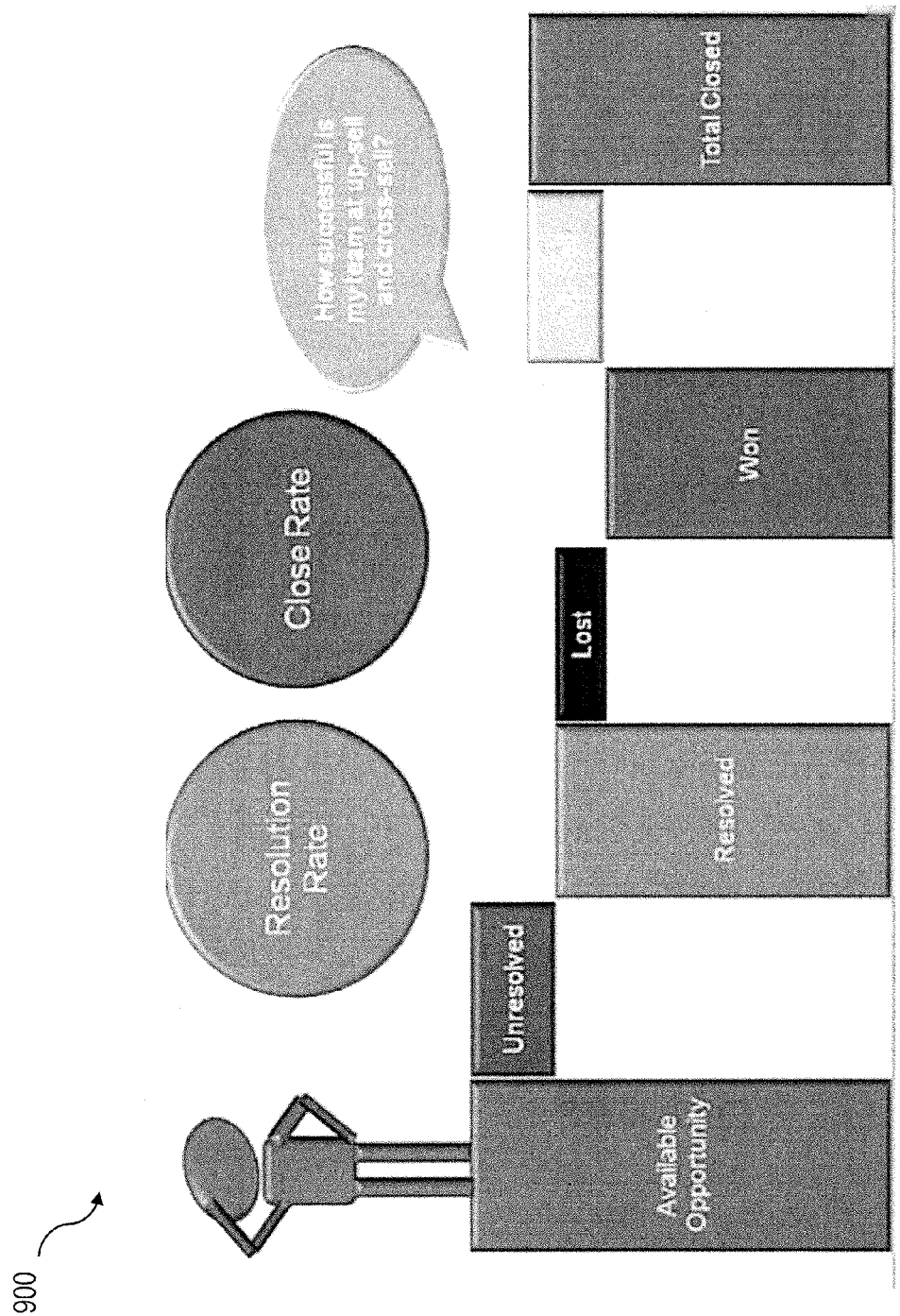

FIG. 9 shows a diagram 900 illustrating aspects of key performance indicator calculations that can be used consistent with implementations of the current subject matter. An existing recurring revenue stream can be protected and, advantageously, enhanced by upselling addition of new recurring revenue assets sold to an existing customer, etc. A mapping can be developed to anticipated and observed customer buying behavior such that a measurable "bucket" or aggregation of available renewal, upselling, and possible new sale opportunities can be collected to facilitate forecasting and measuring of sales team performance.

Information that feeds KPI calculations can include a resolution rate, which measures the fraction of opportunities that were moved to final status within the transaction period (e.g. closed sale+no service) divided by the available opportunity for a sales period; a close rate, which is the ratio of closed (successful) sales to total amount of resolved opportunity (e.g. wins+losses), and measures the fraction of opportunities resolved that were resolved as a win; and a conversion rate, which is an amount of "won" service asset value divided by a targeted, and therefore measures the actual transaction value of closed sale against target value.

The top down approach mentioned above can generally rely upon KPIs and other historical performance metrics applied to opportunity. For example, an available opportunity multiplied by a resolution rate multiplied by a close rate multiplied by a conversion rate can yield a forecast for a sales period. As an example, a sales period with $1.2 M in available opportunity, an 80% expected resolution rate, an 80% close rate, and a 105% conversion rate would have a forecasted target value of $806,000 (e.g. 1.2 M times 80% times 80% times 105%=$806,000).

A bottoms up approach consistent with implementations of the current subject matter can make use of a "commit level" (red, yellow, green) approach, which is a specific forecast percentage applied to each deal. In this manner, a sales team members (representative or operations depending on the configuration of the sales team) can enter a "per opportunity" estimate of the likelihood of that opportunity being successfully resolved (a win). A simplified commit designation scheme (e.g. red/yellow/green) with a limited number of categories each indicating some defined likelihood of a successful close can be relatively straightforward and not as time consuming such that a sales member is more likely to take the care necessary to enter his or her predictions on a regular schedule (e.g. once per week, etc.). Continuing with the boom up approach, every target opportunity can be assigned a commit level representative of an expected outcome probability. An expected close date for each opportunity can also be entered or estimated. A weighted value of the opportunity can be the total available opportunity value for that opportunity multiplied by the commit level (percent chance of success). A forecast of total revenue for a sales period can be the sum of the weighted values of the opportunities projected to close in that sales period.

Implementations of the current subject matter can also support understanding the distribution of associated expiration dates for a given set of offers or opportunities within a target selling period. Offers within a selling period can be differentiated by the expiration date of the service asset associated with each offer. This expiration date, in conjunction with historical comparison data, can be used to help predict the probability of that offer resolving and the probability of that offer closing within more specific date ranges in the selling period (for example within a specific month in a quarter). A recurring revenue management system 202 can support the ability to consistently constrain predictions of outcome so that predictions of outcome early in the selling period properly constrain predictions later in the selling period. These constraints can be updated as time progresses in a quarter and as actual outcomes become available. Opportunity generation can include batching of existing and anticipated recurring revenue assets according to their expiration dates. In some examples, a sales period opportunity metric can be generated based on a calculation of the value of renewal contracts that are available to be completed during the sales period. A sales period can be a different period of time than a quarter (e.g. a month, a week, a year or longer, a day or less, etc.).

Figure 10:
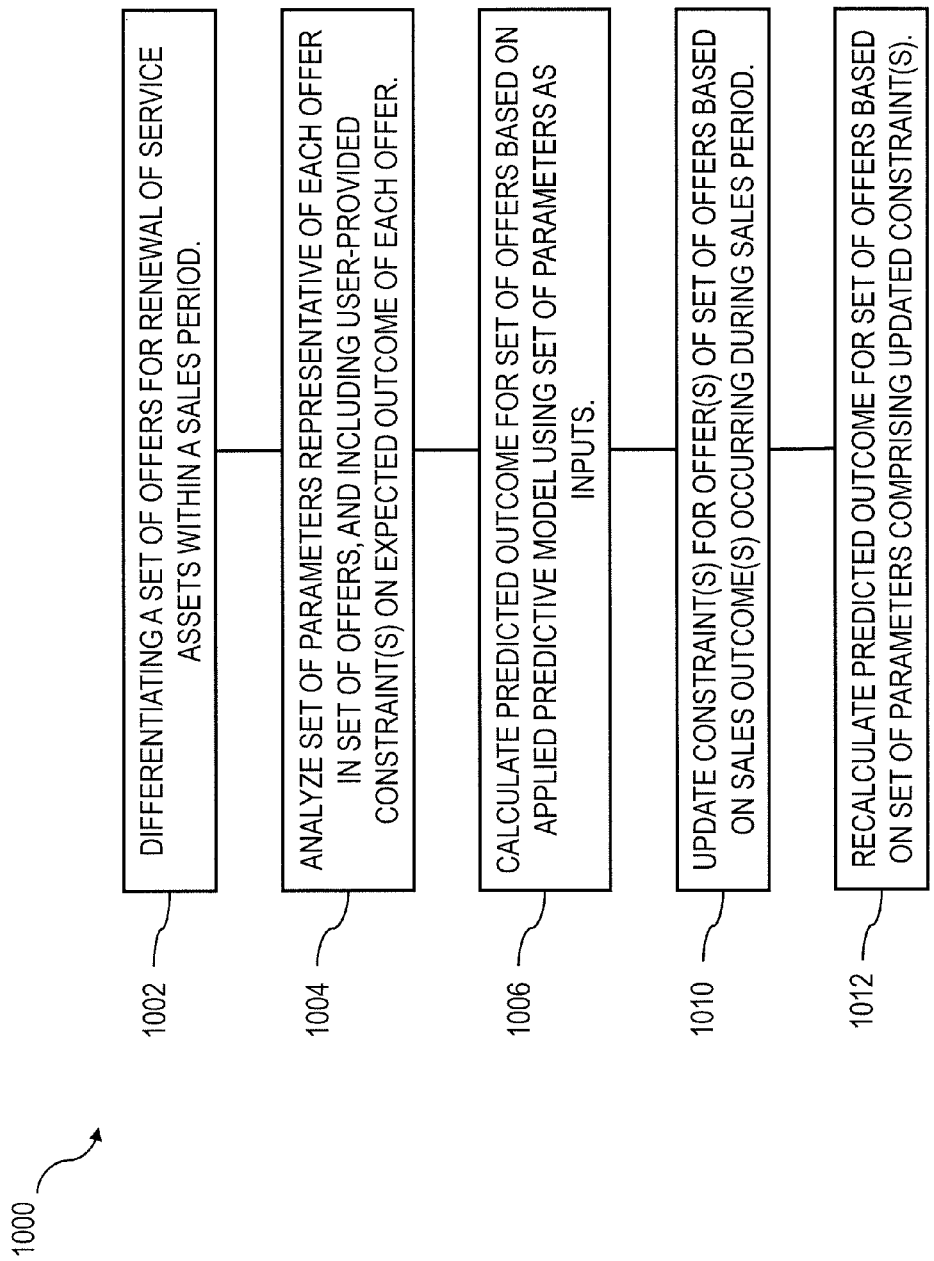
FIG. 10 shows a process flow chart illustrating features of a method consistent with implementations of the current subject matter.

An example of an predictive modeling can be better understood by reference to the process flow chart 1000 shown in FIG. 10, which illustrates features of a method consistent with one or more implementations of the current subject matter. At 1002, a set of offers for renewal of service assets is differentiated within a sales period. The differentiating can be based based at least in part on an expiration date of a service asset associated with each offer of the set of offers. At 1004, a set of parameters representative of each offer in the set of offers is analyzed. The analyzing can include applying a predictive model based on outcomes of other offers for renewal of service assets. The set of parameters includes at least one user-provided constraint on an expected outcome of each offer. For example, the set of parameters can include a predicted commit level assigned to each offer by a representative responsible for each offer. Commit levels are discussed in more detail below. At 1006, a predicted outcome for the set of offers is calculated based on an applied predictive model using the set of parameters as inputs. The at least one constraint for at least one offer of the set of offers is updated based on at least one sales outcome occurring during the sales period at 1010, and at 1012, a predicted outcome for the set of offers is recalculated based on the set of parameters comprising the updated at least one constraint.

Implementations of the current subject matter can provide tools that assist managers and sales staff at a commercial entity in tailoring their sales approach to the purchasing behavior of the customers of the commercial entity. Such behaviors can impact the success of one or more opportunities. Features consistent with the current subject matter can leverage features and capabilities of a recurring revenue management system 202 and asset data model 300 as described herein to track potential opportunities, forecast sales results, target sales staff effort and attention where and when it is likely to be most beneficial, and the like.

In general, an opportunity that is based on an expiring customer contract, other service arrangement, etc. can be assigned one or more different status or outcome indicators. The term "contract" used here to generically refer to a recurring revenue asset as discussed elsewhere in this specification, and can include without limitation an existing contract or agreement, a "free" or low cost warranty or service contract (e.g. as might be included with an original purchase of a product), or the like. Expiring contracts can provide a basis for generation of recurring revenue renewal opportunities. A first indicator (e.g. a metric, designation, label, etc.) associated with an opportunity can include a resolution state. A resolution state is a designation or indicator regarding whether the opportunity remains "open" or, alternatively, has been "resolved" or "closed." An "open" resolution state indicates that the opportunity has not yet been resolved. The selling process has not ended in failure but instead continues to have a chance of being resolved favorably.

A second indicator, metric, etc. associated with an opportunity is an outcome state. An outcome state can be won or lost. As used herein, the term "won" or "win" as it pertains to an outcome state refers to a successful renewal or establishment of paid service, for example a successful close of a renewal of a contract, other service arrangement, etc. based on an opportunity or group of opportunities. An outcome state of "lost" or "no service" or the like refers to an outcome state in which no service was established for a given opportunity or group of opportunities. For example, a lost opportunity based on an expiring contract indicates that any revenue to be received by the commercial entity, as well as any service provided by the commercial entity in satisfaction of the contract of ends when the term of the existing agreement, service, arrangement, etc. expires, and no renewal or continuation of service is paid for by the customer.

A third indicator associated with an expiring contract or group of expiring contracts is a timing state, which relates to a current resolution state of the opportunity relative to the date of expiration of the existing contract or other relationship underlying the opportunity. For example, an opportunity that has a resolution state of open on a date subsequent to the expiration date of an underlying contract, other service arrangement, etc. can have or be assigned a late timing state. An opportunity that has a resolution state of "resolved" and that reached that state prior to the date of expiration of the underlying contract, other service arrangement, etc. can have or be assigned an on-time or optionally an early timing state. Consistent with some implementations of the current subject matter, a closed opportunity can have or be assigned an early timing state if the date of closing occurs prior to a sales period containing the expiration date of an underlying contract, other service arrangement, etc. A closed opportunity can have or be assigned an on-time timing state if the date of closing occurs in a same sales period containing the expiration date of an underlying contract, other service arrangement, etc.

It can generally be observed that customer purchasing behavior is strongly dependent on the timing with which a decision maker or other contact at the customer is presented with an offer in relation to the expiration date of an underlying contract, other service arrangement, etc. For example, if an opportunity for renewal is presented too early (e.g. one or more months in advance of the expiration date of the underlying contract, other service arrangement, etc.), the urgency to close may be lessened due to a tendency to prioritize decision points that are more imminent. An opportunity that remains open after the expiration date of the expiration date of the underlying contract, other service arrangement, etc. can also be at risk as the customer may grow accustomed to proceeding without the service. The urgency of renewing or resuming the service may be lessened, and such opportunities may experience a heightened risk of eventually resolving as a loss.

Consistent with implementations of the current subject matter, the above issues with timing of sales efforts in relation to an expiration date of a contract, other service arrangement, etc. underlying an opportunity can be addressed by grouping opportunities into three sets for a given sales period: carryover, current, and future opportunities. Carryover opportunities can include contracts or other renewal opportunities that expired in a previous sales period but that were not resolved in that previous sales period and thus remain available to close in the current sales period. As noted above, due to typical customer behavior, renewal contracts tend to "age" quickly, meaning that contracts not renewed in a relatively short time after their expiration have a low probability of ever doing so. Current contracts are contracts that expire during the current sales period. Typical customer behavior generally results in renewal purchases occurring most frequently within about 90 days of expiration. As such, current contracts can be of prime importance to many recurring revenue asset sales operations. Future contracts include those contracts that expire after the end of the current sales period. Such contracts are available to be resolved during the current sales period. Closing of a contract early can be useful in protecting the value of the recurring revenue stream. However, closing contracts early at the expense of other contracts that may be expiring sooner can be less advantageous. It can be desirable to prioritize current and carryover opportunities to prevent or reduce the occurrence of potential gaps in the revenue stream.

Figure 11:
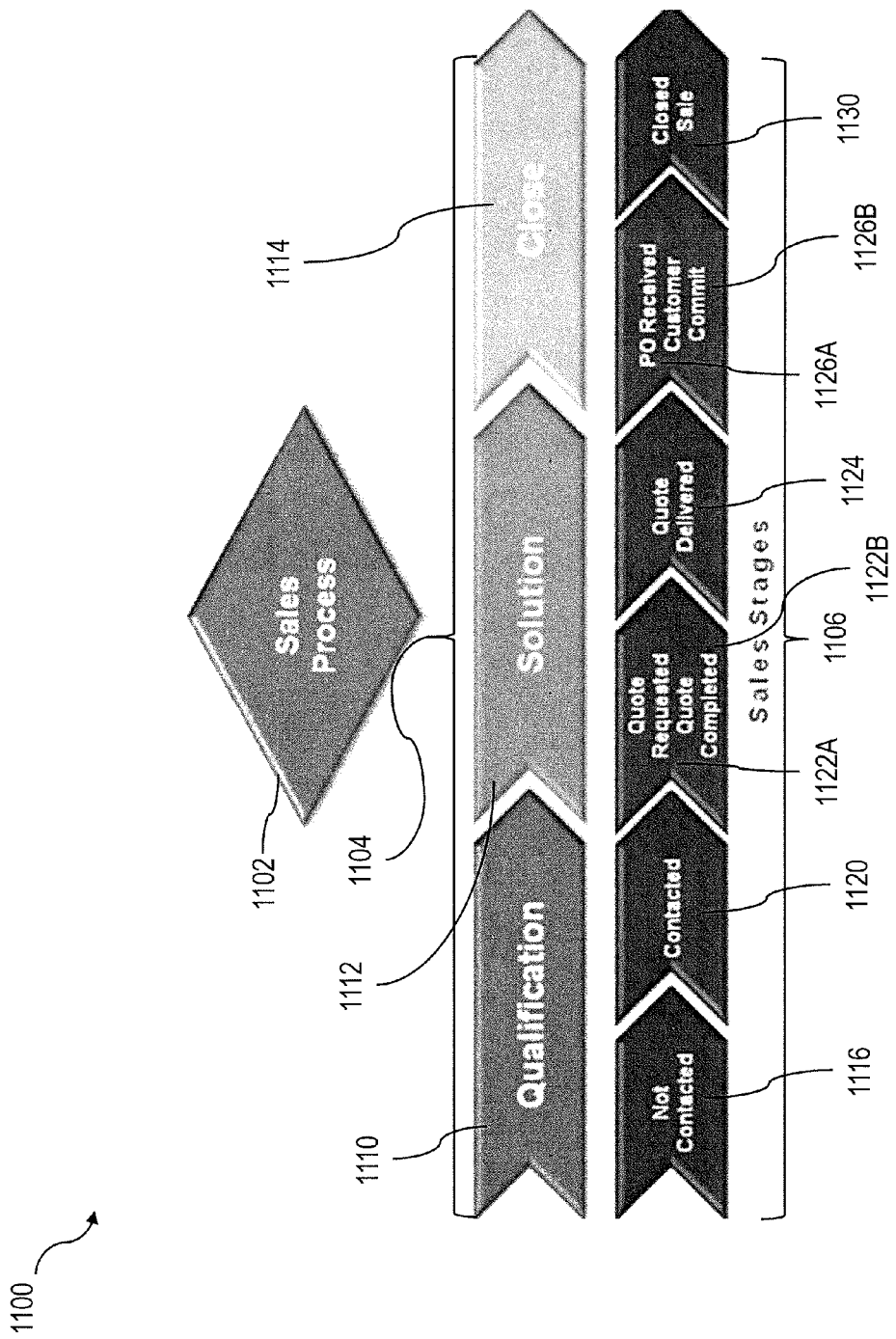
FIG. 11 shows a diagram illustrating features of a sales process consistent with implementations of the current subject matter.

FIG. 11 shows a diagram 1100 illustrating a overview of a guided sales process 1102 that includes a set of sales phases 1104, each including one or more sales stages 1106. The sales phases can include qualification 1110, solution 1112, and close 1114. The sales stages can include not contacted 1116 and contacted 1120 within the qualification sales phase 1110; quotation requested 1122A, quotation completed 1122B, and quote delivered 1124 within the solution sales phase 1112; and purchase order received 1126A, customer commitment 1126B, and closed sale 1130 within the close sales phase 1114.

Implementations of the current subject matter can include at each sales phase 1104 process milestones (which can, for example define the sales stages within a sales phase), information capture requirements, and advancement triggers that can assist in keeping the sale process on track. For example, the qualification sales phase 1110 can include one or more process milestones defining the not contacted and contacted sales stages respectively based on whether an opportunity has been taken up by the sales staff and a qualified buyer (e.g. a decision maker) has been reached. Information captured in the qualification sales phase 1110 can optionally include one or more of logs of customer/qualified buyer contacts; notes, dates, contact type and method, etc. relating to the contact events recorded in the process milestones, scheduling of follow-up tasks, etc. Advancement triggers for the qualification sales phase 1110 can include logging of a successful customer contact, which can cause the sales stage to move from not contacted 1116 to contact 1120. In some examples, the state/phase and monitors can be managed for triggering actions that cause state transitions. Triggering actions can include actions performed by a user in the context of an opportunity (e.g. clicking on "Log Customer Contact" and successfully executing) or can include changes in any data in the opportunity that match a predefined pattern. The set of states, triggering actions, and state transitions can be predefined as part of system configuration and can be subsequently modified.

For the solution sales phase 1112, process milestones can include definitions of the quote requested stage 1122A, quote completed sales stage 1122B, and the quote delivered stage 1124 as follows: a quote can be registered as requested when a sales solution is reached (e.g. an agreement in principle regarding renewal of the opportunity is reached between a sales representative and a decision maker at the customer); as completed when the quotation is ready for delivery; and as delivered when it is actually delivered to the buyer, decision maker, etc. Information captured in the solution sales phase 1112 can optionally include one or more of terms, service levels, and discounts requested by the customer; a revisions history and notes; financial aspects of a quotation; a delivery date and target recipient of the quotation, etc. Advancement triggers for the solution sales phase 1112 can include detection that a sales representative has requested a quotation (e.g. through functionality supported in a user interface of the recurring revenue management system), that a sales operation team member has logged a quotation as completed, that a sales operation team member has logged a quotation as delivered, etc.

For the close sales phase 1114, process milestones can include definitions of the purchase order received sales stage 1126A, customer commitment sales stage 1126B, and closed sale sales stage 1130 as follows: a customer commitment can be indicated by buyer commitment to a payment date, a purchase order received state can be indicated by a payment being sent for processing, and a closed sale can be indicated by a payment being fully processed. Information captured in the close sales phase 1114 can optionally include payment financial information, payment and order dates, an order revision history, terms and service levels to be applied to the renewed contract (e.g. if the terms and/or service levels have changed from a previous contract that has been renewed), etc. Advancement triggers for the close sales phase 1114 can include a sales representative logging a customer commitment (e.g. to move the process to the customer commitment stage 1126A), a sales representative requesting a booking (e.g. to move the process to the purchase order received stage 1126B), a sales operation team member completing a booking (e.g. to move the process to the closed sale stage 1130), etc.

In the event that the sales process 1102 does not result in a successful close, the opportunity is classified as a "loss" as discussed above. A recurring revenue management system 202 consistent with implementations of the current subject matter can also include automated data collection and processing related to losses. Such data and other information can be helpful in assessing the factors that resulted in an unsuccessful sales effort for the opportunity and can support analysis of the efforts of a sales team vs. well-defined metrics. Process milestones for a lost opportunity can include receiving an indication that the customer is not interested in buying (e.g. a "no service" situation), that an opportunity should be identified as invalid (e.g. a "house account"), etc. Information captured for lost opportunities can include identification of the person or persons who declined the opportunity to buy, one or more reasons given by that person or person or other information acquired by the sales representative or other sale steam members regarding reasons for the opportunity being lost, any notes by the sales representative or other sales team member relating to or backing up the loss, etc. Advancement triggers for a lost sale can include the sales representative resolving the opportunity in the system as a loss.

As discussed briefly above, an asset data model 300 consistent with implementations of the current subject matter can track reasons, explanations, etc. relating to resolution of an opportunity, group of opportunities, a single offer, etc. (e.g. a "why" regarding a win or loss outcome for a given opportunity or offer). Outcomes can include a closed (successful) sale, a "house" account (e.g. an invalid opportunity, perhaps relating to an underlying product or service that a customer once had but has since disposed or), or a "no service" outcome in which the customer simply chooses not to purchase a service agreement or subscription or allows an existing agreement to expire without renewing. One or more reason codes can be included and tracked as part of the asset data model for each type of outcome. These codes can be useful in providing feedback to service salespersons, and as additional input data for further analytics and business intelligence processes. For a closed sale, an outcome code can include, without limitation, a backdated sale, a long co-term sale, a short co-term sale, a discounted sale, a multi-year advance sale, a pricing change sale, a re-certification fee included sale, a renewed at par sale, a service downgrade sale, a service upgrade sale, an uncovered sale, or the like. For a house account outcome, an outcome code can indicate, without limitation, one or more of a bad data situation, a cancelled contract or agreement, a covered service, a duplicate service, an end of support condition, an evergreen billing situation, an international transaction, a leasing situation, an OEM customer, an "other" explanation, a product return, a sales pullback by the customer, or the like. For a no service outcome, an outcome code can indicate, without limitation, one or more of a replacement of the product by the customer, a competitive distributed value added reseller (DVAR), a competitive product replacement, another explanation for a competitive service loss, a customer cost-benefit decision, that the customer no longer exists, a customer satisfaction driven refusal to buy or renew, that the covered product or service is at the end of its service life, some other data management issue, a decommissioned or otherwise removed from service product, a third party maintenance agreement, an unresponsive end user, an unresponsive value added reseller (VAR), a no service VAR, or the like.

Descriptions herein of a sales process and sales personnel make reference in some examples to sales representatives and sale operation team members. One aspect of the current subject matter can include an integrated sales operations approach in which activities relating to the selling process for renewals between can be bifurcated between selling activity and back office sales support activity. Selling activity in this example refers to what is typically assumed to be an important sales representative skill, specifically contacting buyers, decision makers, etc. at a customer and presenting an attractive value proposition that motivates the purchasing party to choose to complete a purchase. The skill set relating to such activities is a valuable one to a commercial entity, so a recurring revenue management approach that maximizes the utilization of these skills can be quite advantageous. Accordingly, user interface views provided by a recurring revenue management system 202 consistent with implementations of the current subject matter can support different view for different users.

Figure 12:
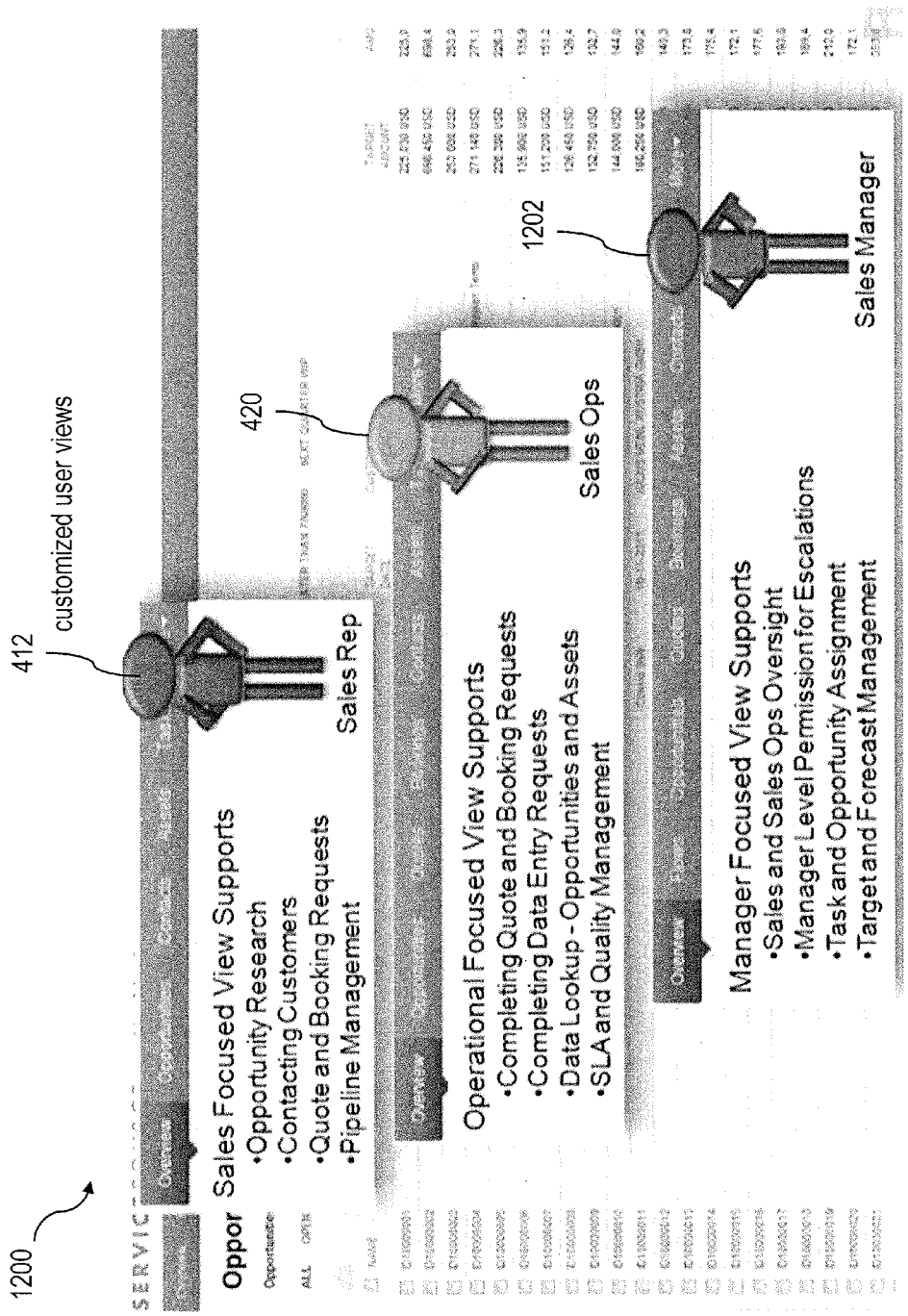
FIG. 12 shows an annotated user interface view illustrating features relating to bifurcation of sales team responsibilities.

FIG. 12 shows an annotated screenshot view 1200 that indicates division of roles among sales representatives 412, sales operations team members 420, and sales managers 1202. As shown in the example screenshot view 1300 of FIG. 13, a sale representative 412 can be shown a focused view that supports one or more of opportunity research, contacting of customers, creating quotation and booking requests, pipeline management, and the like. As shown in the example screenshot view 1400 of FIG. 14, a sales operations team member 420 can be shown a focused view that supports one or more of completing quotation and booking requests; data look-up relating to opportunities, assets, and the like; service-level agreements (SLA) and quality management; and the like. As shown in the example screenshot view 1500 of FIG. 15, a sales manager 1202 can be shown a focused view that supports one or more of sales and sales operation oversight, manager level permission for escalations, tasking opportunity assignments, target and forecast management, and the like.

Through the use of a recurring revenue management system 202 that supports these focused views on the user interface that are tailored to specific roles in a sales team, the recurring revenue management system 202 enables tight coupling between quotation generation, booking generation, etc. in response to requests from the sales representative 412 that are generated through buyer contacts and sales activities. Additionally, the underlying asset data model 300, which can be part of a recurring revenue management system 202 consistent with implications of the current subject matter, can support tight coupling of the sales process with underlying data services. In this manner, data management and quality of data underlying the sales process and the renewal process can be optimized. Furthermore, data that are quality enhanced or added to as part of a sales process can optionally be propagated back to one or more external client systems 114.

Figure 16:
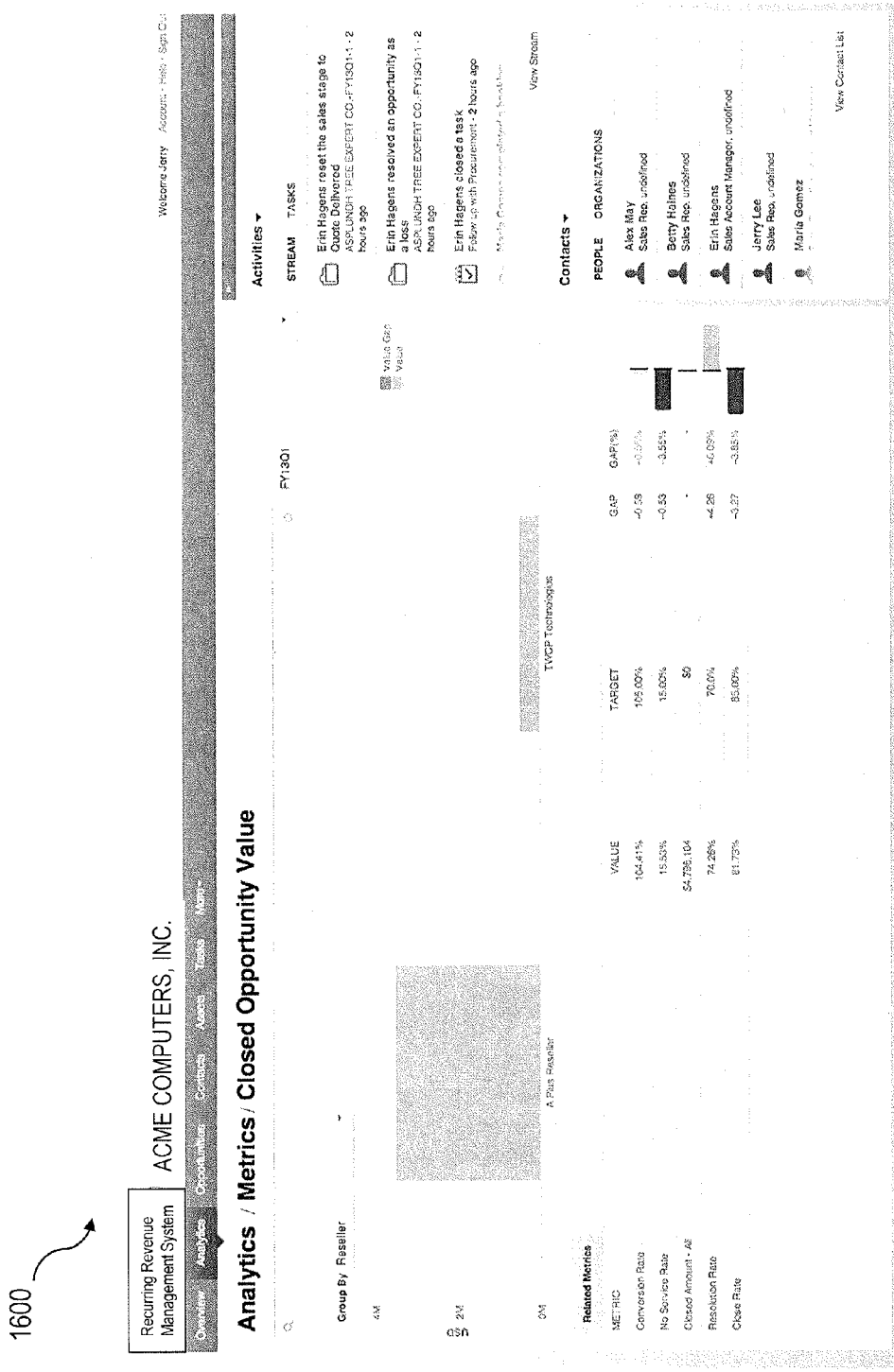
Figure 17:
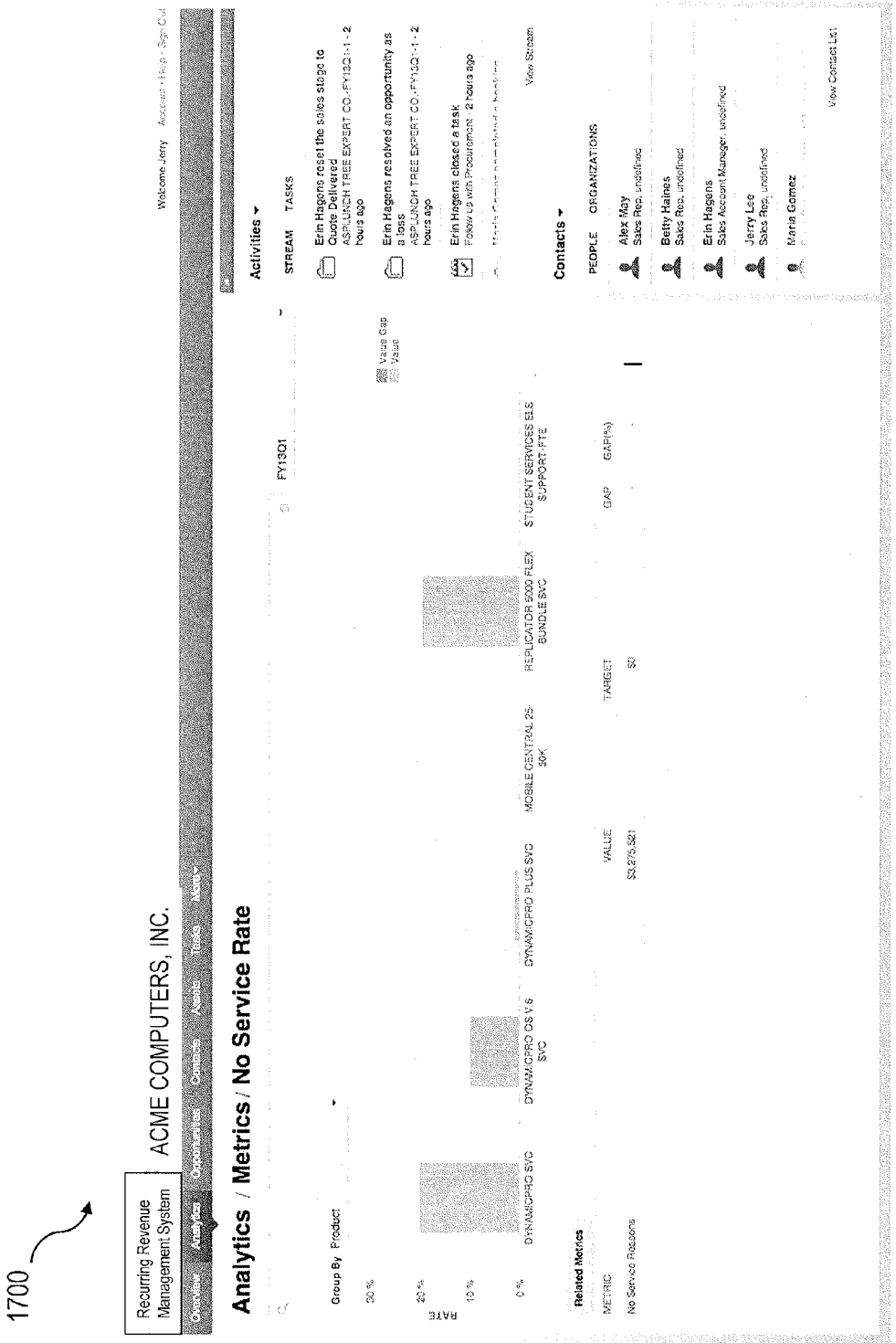
Figure 18:
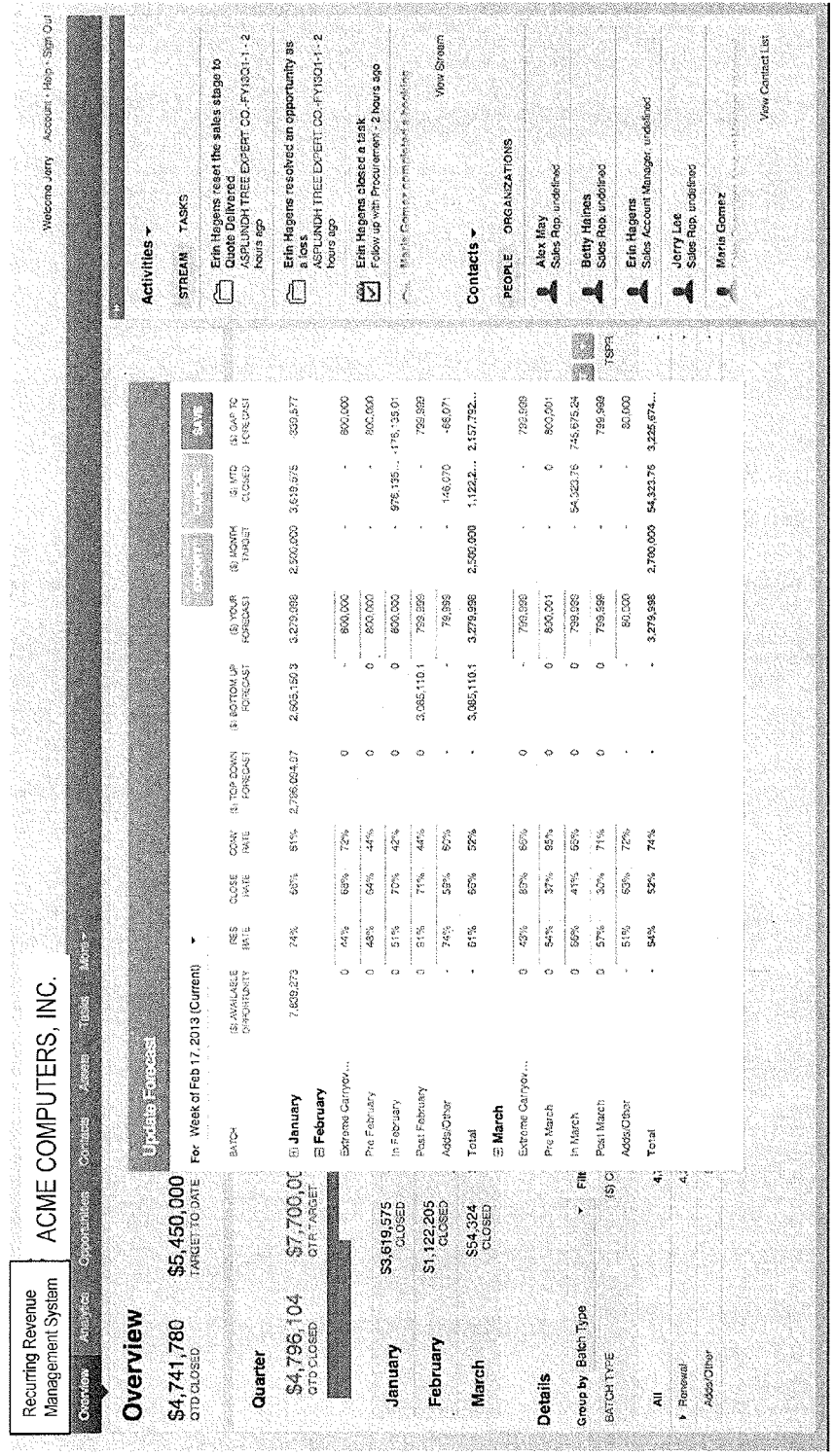
Figure 19:
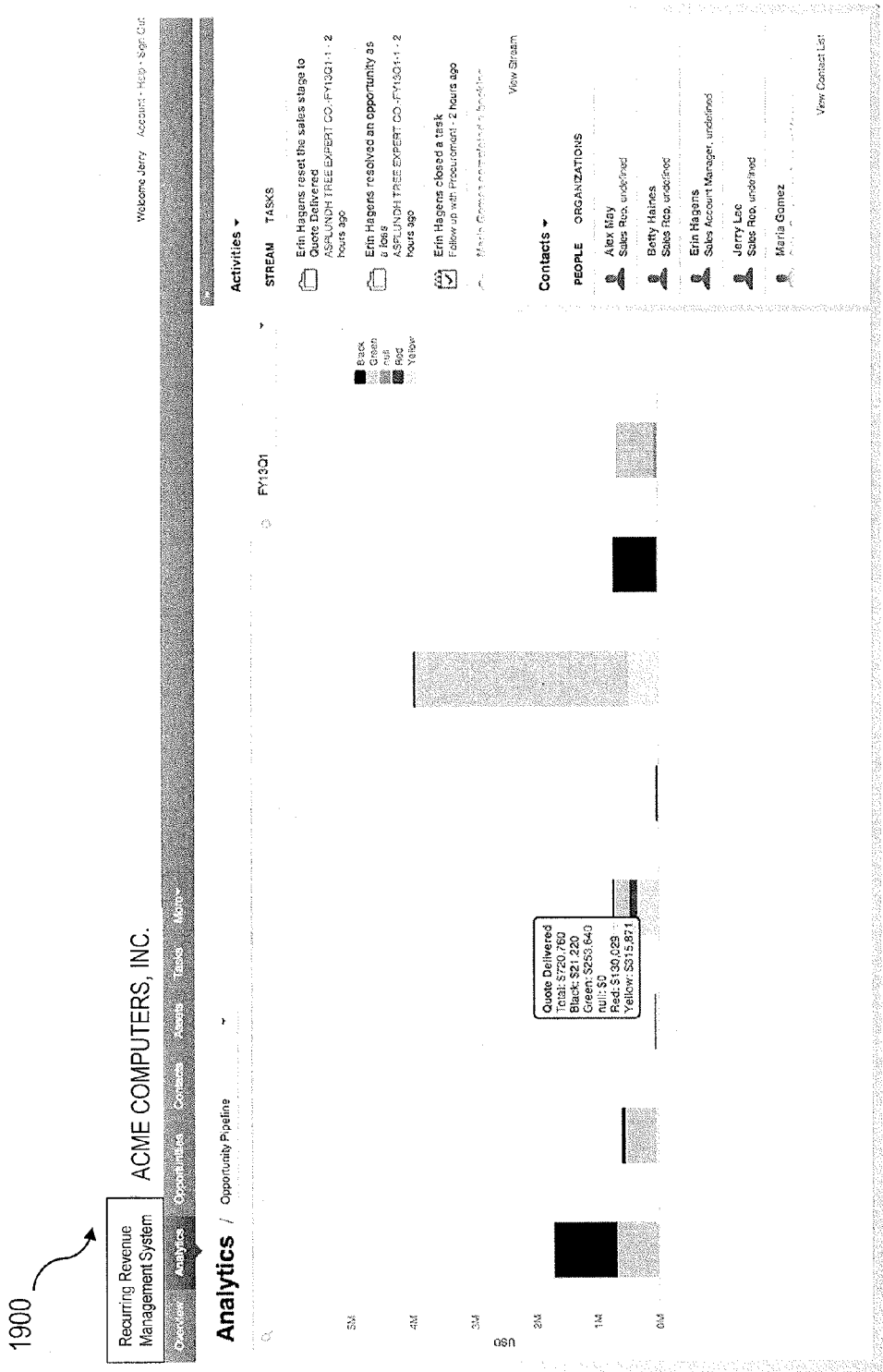
Figure 20:
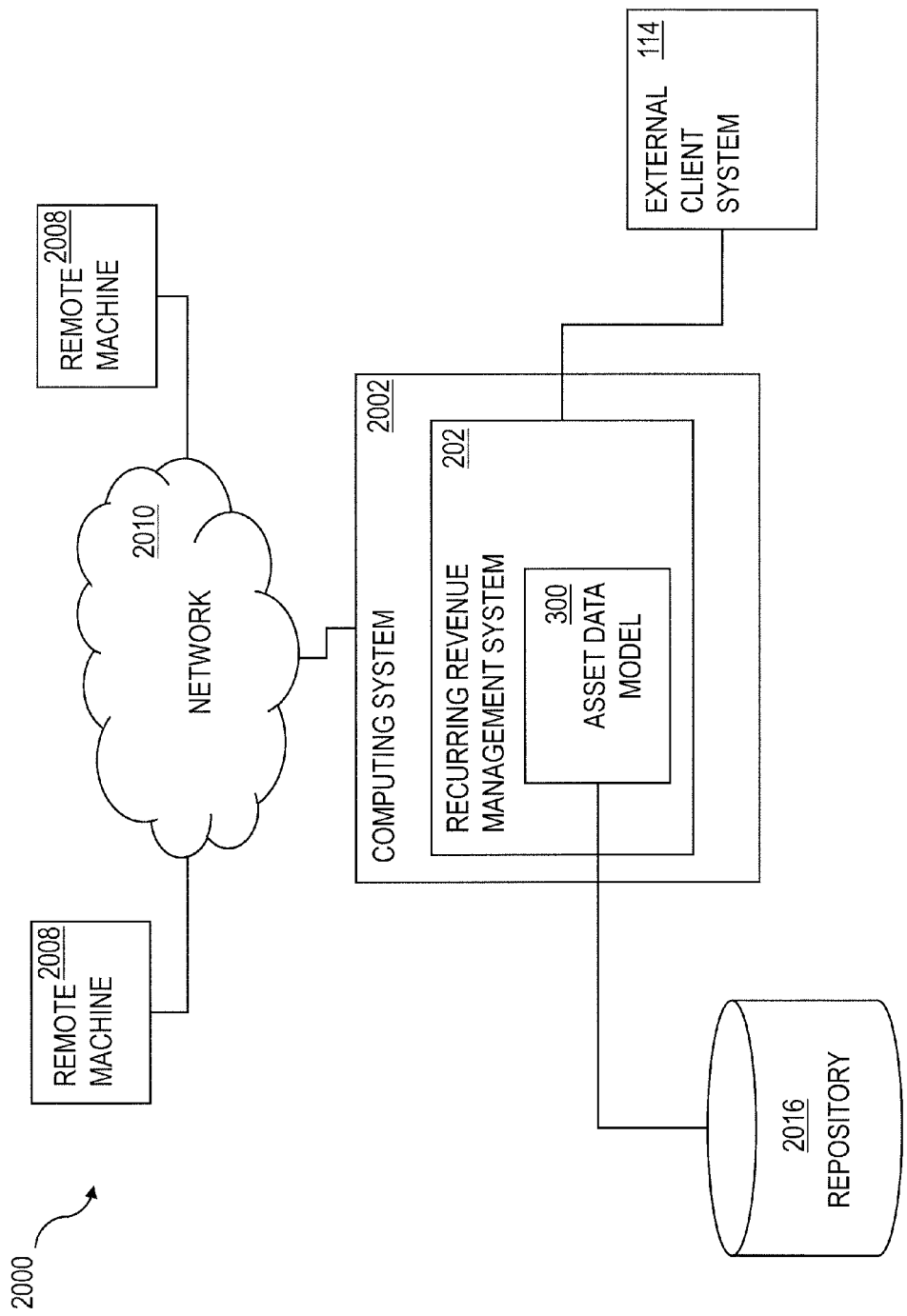
FIG. 20 shows an example of a computing landscape having one or more features that can be included in implementations of the current subject matter.

Management, measurement, and monitoring of service sales activities can be supported by one or more implementations of the current subject matter to ensure a consistent approach to managing opportunities, quotes and bookings activities. A recurring revenue management system can include one or more features such as detailed reports that can enable a sales staff member (e.g. a sales representative) to proactively identify and address at-risk opportunities, pipeline dashboards to enable a manager to view pacing by time period and production metrics, opportunity details to enable viewing of deal progress and logged activities, territory management to enable manager and the like to drive sales staff behavior by assigning tasks to opportunities based on existing priorities, and the like. FIG. 16 shows an example screenshot view 1600 illustrating features of an analytics view displaying metrics relating to closed opportunity value. FIG. 17 shows an example screenshot view 1700 illustrating features of an analytics view displaying metrics relating to a no service (e.g. "loss") rate for closed opportunities. FIG. 18 shows an example screenshot view 1800 illustrating features of an analytics view displaying a forecast dashboard for displaying forecast information. FIG. 19 shows an example screenshot view 1900 illustrating features of an analytics view displaying metrics relating to an opportunity pipeline.

A recurring revenue management approach consistent with one or more implementations of the current subject matter can generate dynamic feedback and directed task navigation for a user of a recurring revenue management system based on one or more frameworks and roles as noted above. In some examples, the directed task navigation can be designed to maximize the time that sales representatives can spend on sales-related activities for which their skill-set is an advantageous match. Based on the ability to identify sales issues or operational issues discovered in a role-based dashboard by using or identifying data via search facets, a user or manager can logically group a set of opportunities that meet certain characteristics. For example, a user or manager can readily find all opportunities that have an expiration date of prior to a target date or date range (e.g. prior to 2014) and a sales stage of Not Contacted where the Incumbent Reseller is a specific company (e.g. ABC, Inc.). Those opportunities can then be assigned to a specific task type, such as creating a quote, requesting a booking, contacting the customer, or resolving data issues and assigned to a specific role or user. Progression or evolution of the set of activities relative to that logical grouping of work can then be monitored over time as activities are completed or resolved.

Figure 13:
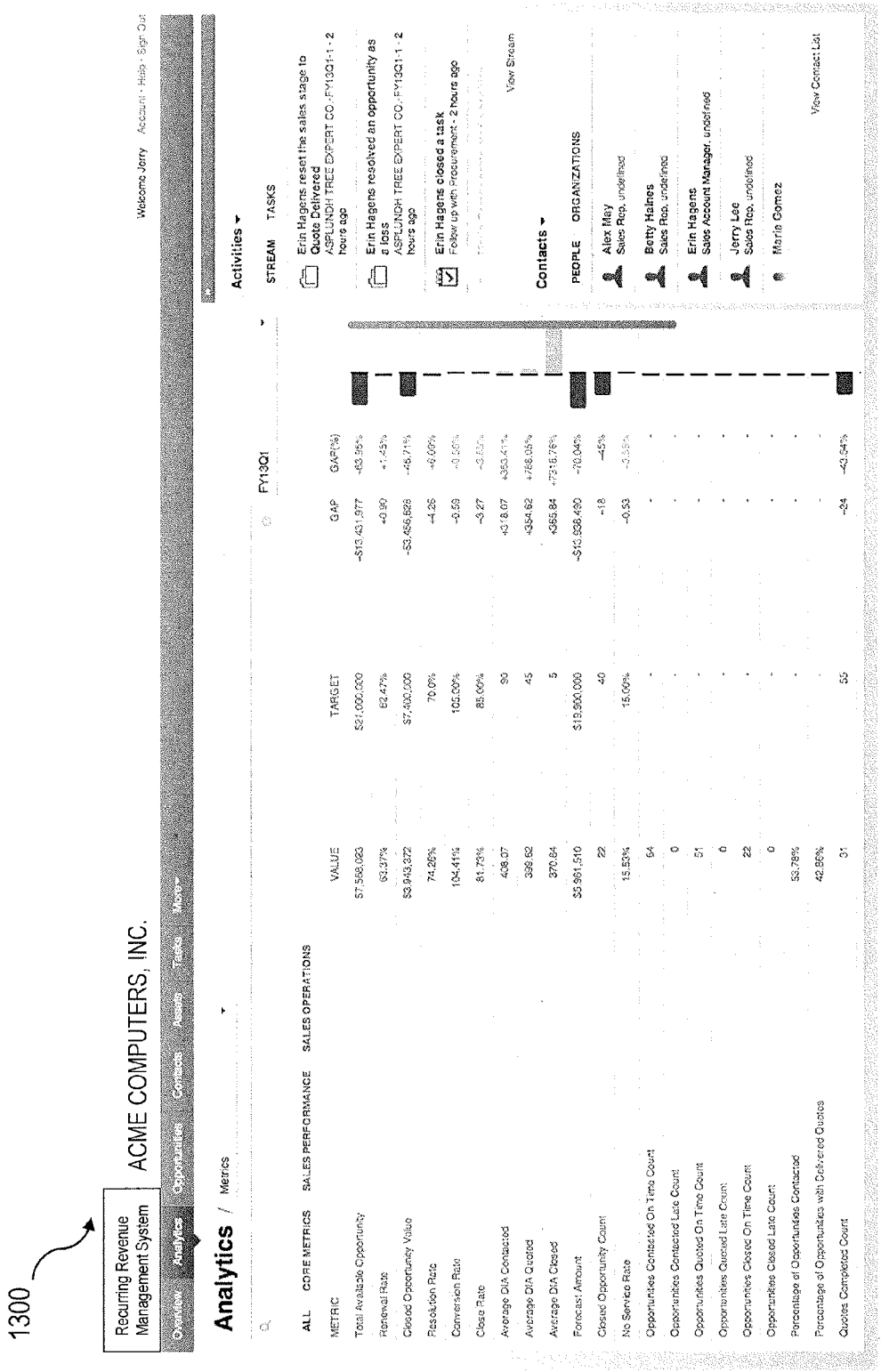

FIG. 13 shows an annotated screenshot view 1300 of a user interface illustrating features that can be included consistent with implementations of the current subject matter. As shown, the user interface can include multiple sections, which can optionally be accessed via a tab bar or other user interface functionality and need not be all displayed on a same screen. The multiple sections can be related to various components of the sales process, for example those discussed in relation to FIG. 4 above. For example, a first section of the screen 1302 can provide one or more pieces of information relating to a covered asset 404. Another section of the screen 1304 can provide one more piece of information relating to a service asset 402, or alternatively, more than one service asset 402, that are related to the covered asset 404. The service asset section 1304 can include information relating to an offer 406 that is related to the service asset 402, as well as information relating to an opportunity that includes the offer 406. Via a tab bar 1306, or other user interface functionality, it can be possible for a user to link to additional screens that provide more detailed information on aspects of the customer relationship including characterization of the customers install base or other underlying product or contract information 1306, current or past year sales information 1310, transaction information 1312, or the like.

Figure 14:
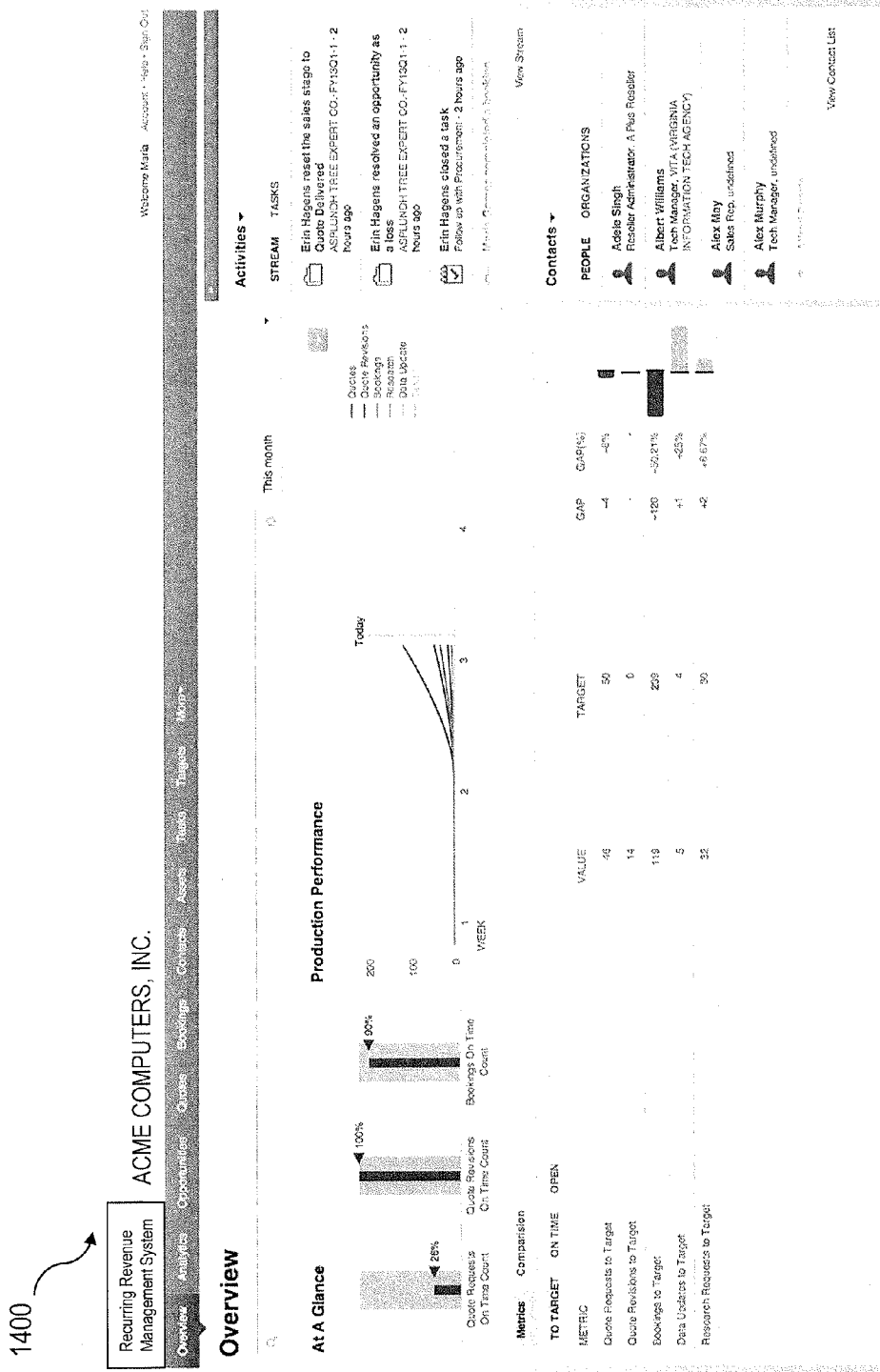

FIG. 14 shows a diagram illustrating a process consistent with implementations of the current subject matter for generating offers based on existing service assets 402 and the underlying covered assets 404. Using the relationships between the data objects 301 in the asset data model 300, links can be identified and exploited between covered assets 404 that are part of an installed product base at a customer and recurring revenue assets (service assets 402). A service asset 402 generally has a current term 1402, which further includes an expiration date. A service asset 402 also generally has a current service level 1404 associated with it as well as a current contract value 1406. These data are generally included within an instance of an asset data object 304 that is part of the asset data model 300, that represents the service asset 402, and that is linked by a relationship with the instance of a product data object 302 representing the covered asset 404. As the expiration date of the term 1402 of the service asset 402 approaches, and offer 406 is generated. The offer 406 includes an offer term 1410, and offer service level 1412, and a offer target amount 1414. The offer term 1410 indicates the proposed period of time for which the service asset 402 is to be renewed. The offer service level 1412 is generally initially set at the current service level 1404, and the offer target amount 1414 is generally initially set at the current contract value 1406.

A recurring revenue management system 202 consistent with implementations of the current subject matter can employ an asset data model specialized for recurring revenue asset sales and renewals. The asset data model can include fields related to service timing events, service outcomes, relationships to other assets and other context specific fields. For example, in support of new sales of recurring revenue assets (e.g. a new service contract, a new subscription, etc.), a recurring revenue management system can process information received from the external client sources and optionally also updated information generated through sales contacts, ongoing sales and renewal operations, and other functions supported by the recurring revenue management system to populate data values in one or more fields relating to one or more of a local opportunity amount, a local transaction amount, an earliest existing end date, an earliest new start date, a latest new end date, a commit level (Red, Yellow, Black, Green, or other representational scheme), a renewal sales stage, a covered product, a service product, a service product description, a client batch quarter, a win/loss result explanation, an existing contract number, an existing purchase order number, an existing distributor, an existing reseller, a new distributor, a new reseller, and the like.

In support of renewal sales of recurring revenue assets (e.g. a renewal of an existing contract, a value-added upsell of an existing contract, etc.), a recurring revenue management system can process information received from the external client sources and optionally also updated information generated through sales contacts, ongoing sales and renewal operations, and other functions supported by the recurring revenue management system to populate data values in one or more fields relating to one or more of a not contacted/contacted status, a quote requested status, a quote delivered status, a customer commitment status, a purchase order received status, as closed sale status, etc.

A recurring revenue management system consistent with implementations of the current subject matter can include a mechanism for coordinating online and offline activities of sales teams and individuals to optimally coincide with expiration or other timing events associated with a service sale. Such mechanisms can include automated workflows that guide when and how customers are contacted, when activities such as quote request and quote presentment are executed, and when escalations occur. The sales process can incorporate one or more key metrics associated with service sales, such as for example resolution rate, close rate, conversion rate, and the like that can be used to optimize performance.

A recurring revenue management system consistent with implementations of the current subject matter can also implement one or more team coordination processes for pipelines and territories that ensure optimization of team outcomes. The processes, metrics and workflows required to drive a sales outcome can be encoded in software and computer program products, to enable the recurring revenue management system to perform predictive performance management.

Automated or semi-automated forecasting of team-based service sales can also be supported by a recurring revenue management system consistent with implementations of the current subject matter. The recurring revenue management system can provide a framework for data collection from representatives based on key sales metrics, and which allows representatives to follow a periodic (i.e. weekly) computer-generated discipline process, leading to accurate monthly and quarterly sales forecasts. The forecasting processes can incorporate a dual estimation approach, where bottom-up (individual opportunity assessment-based) and top-down (expiration date grouping-based) calculations are employed.

User-configured sales automation programs can be used to drive specialized process behavior for specific sets of opportunities and service sales operations. These automation programs can include adaptive quote and bookings management for service sales. Capabilities of adaptive quote and bookings management functionality consistent with one or more implementations of the current subject matter can include quote request categorization (e.g. to identify key properties of the quote to guide processing), quote request routing (e.g. to route a request to a proper resource, either human or automated, to maximize processing efficiency), statistical prediction of quote request outcomes (e.g. to predict a probability of rejection and project a required processing time), SLA management (e.g. to effectively measure on-time performance and to guide expectations of quote requestors), throughput forecasting and management (e.g. to manage workload and properly price quote processing services), semi-automated bookings reconciliation (e.g. to allow reconciling an opportunity-based sale, such as from a CRM perspective, with an external order management system view), a dynamic (i.e. rules-based or algorithmic) performance management engine for optimizing work/activity allocation, and the like.

A recurring revenue management system can further include modules for managing a complex channel partner network. The capabilities of the channel partner network management module(s) can include one or more of a federated permission model that allows OEMs to efficiently distribute access to opportunities across a multi-level network of channel partners, incumbency logic that determines which opportunities should be visible to any given channel partner, gathering and disseminating forecast information from each channel, sales incentive programs that can be executed across the channel, self-service management by channel partners (e.g. to allow management of users and permissions for that partner), quote processing management (e.g. dynamically across a multi-level channel), and the like. For example, a user interface can be provided for access by channel partners to display a selection of renewal ready defined opportunities for these channel partners to pursue based on underlying covered assets sold, leased, etc. by an original equipment manufacturer (OEM). This or other user interfaces can include one or more renewal metrics similar to those discussed above, and can be based on value to the OEM. In addition, data regarding renewal process operations occurring at a channel partner can optionally be synchronized back to an asset data model 300 maintained by or on behalf of the OEM. Projections, targeting, forecasting, and the like as discussed above can be supported for a channel partner, for example in a manner similar to those approaches discussed elsewhere herein.

A recurring revenue management system can also support holistic analysis of customer success management (CSM), which can include one or more of service asset analysis, sales execution analysis, sales operations analysis, and the like. These features of SRM can include analytical capabilities to collect and display benchmark comparisons for all aspects of SRM.

As an example of these benchmarking capabilities, the recurring revenue management system 202 can access aggregate information regarding service revenue and other recurring revenue stream renewals, sales, etc. generated by one or more other commercial entities external to the commercial entity whose sales processes are automated through use of the recurring revenue management system 202. For example, if the recurring revenue management system 2902 is provided via a software as a service (SaaS) framework, the SaaS provider can have the ability to aggregate, e.g. into a database, the sales process outcome data from a number of commercial entities and to make these aggregated data available in the form of benchmarks and other metrics against which the sales outcomes of a specific commercial entity, a sales team within the commercial entity, an individual sales representative, etc. can readily be compared.

As a further feature of a recurring revenue management system 202 consistent with some implementations of the current subject matter, the aggregated data discussed above can serve as an input for one or more predictive models that can be applied in improving the forecasting and targeting functions discussed above. In one example, a set of parameters representative of a specific offer can be analyzed by a predictive model based on outcomes of other offers, either within a given commercial entity or across aggregated data generated by more than one commercial entity to calculate a predicted outcome for that offer. The results of this kind of modeling can optionally be used in an iterative manner, for example to test different possible sales approaches (e.g. timing of a first contact relative to a current service asset expiration date, time elapsed in the sales process from first contact by a sales representative to delivery of a quote, etc.) to identify a set of predicted best practices.

Predictive models can also support aggregate opportunity outcome predictions, for example to forecast renewal rates, values, resolution rates, etc. for a group of available offers or opportunities. The outcome predictions can optionally include projections of the value of a set of service assets at some point in the future, a total amount of projected revenue for a set of service assets, etc.

Predictive models based on historical sales execution data can be used to provide one or more of the following types of predictive analytics: predictions of a probability of an offer closing within a particular time window based on customer, product, and time gap from expiration; predictions of an expected value of an offer if closed within a particular time window based on customer, product, and time gap from expiration; predictions of a probability of an upgrade of an offer if the offer is closed within a particular time window based on customer, product, and time gap from expiration; etc. Predictive models consistent with implementations of the current subject matter can be built using machine learning approaches such as survival analysis, clustering, and regression analysis. The models can be encoded into the application for use in the form of predictor functions that augment data in the system.

FIG. 2000 shows a diagram of a computing landscape consistent with one or more implementations of the current subject matter. A computing system 2002 can perform operations, execute code, or otherwise implement a recurring revenue management system 202. The recurring revenue management system 202, which can include a asset data model 300, provides one or more features as discussed above. The computing system 2002 can be accessed by one or more remote machines 2008, for example via a direct connection, a local terminal, or over a network 2010 (e.g. a local area network, a wide area network, a wireless network, the Internet, or the like). External client systems 114 can also be access via direct connections and/or over the same network 2010 or one or more other networks. The asset data model 300 and recurring revenue management system 202 can be in contact with one or more repositories 2016, again either via direct connection and/or over the same network 2010 or one or more other networks. Aspects of the current subject matter can also be provided via a multi-tenant environment, in which data records, etc. of multiple client organizations are retained on a common repository or set of repositories while being isolated from access except by the owner of the specific data records, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. For example, any references to methods, algorithms, calculations, receiving data, sending data, storing data, other data processing tasks or the like can include the execution of such operations at least in part by at least system, each of which includes at least one programmable processor. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example, a liquid crystal display (LCD), or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a machine-readable medium storing instructions that, when executed by at least one programmable processor, cause the at least one programmable processor to perform operations comprising:
   generating a user interface for an electronic display, the user interface including a graphical representation of one or more asset data objects generated during a pre-defined time window, the graphical representation representing each of the one or more asset data objects and displaying one or more metrics that define each of the one or more asset data objects;
   calculating a predicted outcome for the asset data objects, the calculating being from a predictive model that is based on aggregate historical data collected from one or more client data sources, the calculating comprising:
      extracting past outcomes of historical asset data objects from the aggregate historical data;
      receiving parameter data in response to user-generated input setting the parameter data at the user interface, the parameter data comprising a set of parameters constraining the predicted outcome to a specified forecast percentage; and
      calculating, with the predictive model, the predicted outcome based on the extracted past outcomes and the received parameter data constraining the calculated predicted outcome;
   generating, for concurrent display in the user interface with the graphical representation of one or more asset data objects, a graphical representation of the predicted outcome;
   monitoring the asset data objects generated during the pre-defined time window for a change in an acceptance status of at least one of the asset data objects;
   recalculating, in response to the change in the acceptance status, the predicted outcome with the predictive model, the recalculating comprising:
      updating the parameter data in response to the change in acceptance status; and
      generating an updated predicted outcome with the predictive model based on the updated parameter data; and
   generating, for concurrent display in the user interface with the graphical representation of one or more asset data objects, an updated graphical representation of the updated predicted outcome.

2. A computer program product as in claim 1, wherein the operations further comprise: combining the user interface with real-time data related to at least one of the one or more asset data objects for display in a recurring revenue management dashboard being displayed in the electronic display.

3. A computer program product as in claim 1, wherein each of the one or more asset data objects includes an expiration, and wherein the one or more metrics includes a time period in advance of the expiration of at least one of the one or more asset data objects.

4. A computer program product as in claim 3, wherein the operations further comprise: generating a graphical representation of the time period in advance of the expiration for display in the user interface in reference to the at least one of the one or more asset data objects.

5. A computer program product as in claim 1, wherein the operations further comprise:
   calculating real-time analytics based on user-selected metrics and user-inputted parameters related to at least one of the one or more asset data objects; and
   generating, for concurrent display in the user interface with the graphical representation of one or more asset data objects, a graphical representation of the real-time analytics.

6. A computer program product as in claim 1, wherein the operations further comprise:
   defining one or more roles for users of the electronic display; and
   assigning each of the one or more roles to a unique recurring revenue management dashboard that contains the user interface.

7. A computer program product as in claim 6, wherein the operations further comprise: mapping selected ones of the one more asset data objects to each of the one or more roles.

8. A computer program product as in claim 1, wherein the graphical representation of the one or more asset data objects further comprises a graphical representation of a ranking of the one or more asset data objects.

9. A computer program product as in claim 8, wherein the graphical representation of the ranking is based on a representation of a time from an expiration of each of the one or more asset data objects.

10. A recurring revenue management system comprising:
    at least one programmable processor; and
    a machine-readable medium storing instructions that, when executed by the at least one processor, cause the at least one programmable processor to perform operations comprising:
    generate a user interface for an electronic display, the user interface including a graphical representation of one or more asset data objects generated during a pre-defined time window, the graphical representation representing each of the one or more asset data objects and displaying one or more metrics that define each of the one or more asset data objects;
    calculate a predicted outcome for the asset data objects, the calculating being from a predictive model that is based on aggregate historical data collected from one or more client data sources, the calculating comprising:
       extract past outcomes of historical asset data objects from the aggregate historical data;
       receive parameter data in response to user-generated input setting the parameter data at the user interface, the parameter data comprising a set of parameters constraining the predicted outcome to a specified forecast percentage; and calculate, with the predictive model, the predicted outcome based on the extracted past outcomes and the received parameter data constraining the calculated predicted outcome;

generate, for concurrent display in the user interface with the graphical representation of one or more asset data objects, a graphical representation of the predicted outcome;

monitor the asset data objects generated during the pre-defined time window for a change in an acceptance status of at least one of the asset data objects;

recalculate, in response to the change in the acceptance status, the predicted outcome with the predictive model, the recalculating comprising:

update the parameter data in response to the change in acceptance status; and generate an updated predicted outcome with the predictive model based on the updated parameter data; and generate, for concurrent display in the user interface with the graphical representation of one or more asset data objects, an updated graphical representation of the updated predicted outcome.

11. A recurring revenue management system as in claim 10, wherein the operations further comprise: combining the user interface with real-time data related to at least one of the one or more asset data objects for display in a recurring revenue management dashboard being displayed in the electronic display.

12. A recurring revenue management system as in claim 10, wherein each of the one or more asset data objects includes an expiration, and wherein the one or more metrics includes a time period in advance of the expiration of at least one of the one or more asset data objects.

13. A recurring revenue management system as in claim 12, wherein the operations further comprise: generate a graphical representation of the time period in advance of the expiration for display in the user interface in reference to the at least one of the one or more asset data objects.

14. A recurring revenue management system as in claim 10, wherein the operations further comprise:

calculate real-time analytics based on user-selected metrics and user-inputted parameters related to at least one of the one or more asset data objects; and generate, for concurrent display in the user interface with the graphical representation of one or more asset data objects, a graphical representation of the real-time analytics.

15. A recurring revenue management system as in claim 10, wherein the operations further comprise:

define one or more roles for users of the electronic display; and assign each of the one or more roles to a unique recurring revenue management dashboard that contains the user interface.

16. A recurring revenue management system as in claim 15, wherein the operations further comprise: map selected ones of the one more asset data objects to each of the one or more roles.

17. A recurring revenue management system as in claim 10, wherein the graphical representation of the one or more asset data objects further comprises a graphical representation of a ranking of the one or more asset data objects.

18. A recurring revenue management system as in claim 17, wherein the graphical representation of the ranking is based a representation of a time from an expiration of each of the one or more asset data objects.

19. A method comprising:

generating, by one or more processors, a user interface for an electronic display, the user interface including a graphical representation of one or more asset data objects generated during a pre-defined time window, the graphical representation representing each of the one or more asset data objects and displaying one or more metrics that define each of the one or more asset data objects;

calculating, by the one or more processors, a predicted outcome for the asset data objects, the calculating being from a predictive model that is based on aggregate historical data collected from one or more client data sources, the calculating comprising:

extracting past outcomes of historical asset data objects from the aggregate historical data;

receiving parameter data in response to user-generated input setting the parameter data at the user interface, the parameter data comprising a set of parameters constraining the predicted outcome to a specified forecast percentage; and calculating, with the predictive model, the predicted outcome based on the extracted past outcomes and the received parameter data constraining the calculated predicted outcome;

generating, by the one or more processors for concurrent display in the user interface with the graphical representation of one or more asset data objects, a graphical representation of the predicted outcome;

monitoring, by the one or more processors, the asset data objects generated during the pre-defined time window for a change in an acceptance status of at least one of the asset data objects;

recalculating, by the one or more processors in response to the change in the acceptance status, the predicted outcome with the predictive model, the recalculating comprising:

updating the parameter data in response to the change in acceptance status; and generating an updated predicted outcome with the predictive model based on the updated parameter data; and generating, by the one or more processors for concurrent display in the user interface with the graphical representation of one or more asset data objects, an updated graphical representation of the updated predicted outcome.

20. A method as in claim 19, further comprising combining, by the one or more processors, the user interface with real-time data related to at least one of the one or more asset data objects for display in a recurring revenue management dashboard being displayed in the electronic display.

21. A method as in claim 19, wherein each of the one or more asset data objects includes an expiration, and wherein the one or more metrics includes a time period in advance of the expiration of at least one of the one or more asset data objects.

22. A method as in claim 21, further comprising generating, by the one or more processors, a graphical representation of the time period in advance of the expiration for display in the user interface in reference to the at least one of the one or more asset data objects.

23. A method as in claim 19, further comprising:
calculating, by the one or more processors, real-time analytics based on user-selected metrics and user-inputted parameters related to at least one of the one or more asset data objects; and
generating, by the one or more processors and for concurrent display in the user interface with the graphical representation of one or more asset data objects, a graphical representation of the real-time analytics.

24. A method as in claim 19, further comprising:
defining, by the one or more processors, one or more roles for users of the electronic display; and
assigning, by the one or more processors, each of the one or more roles to a unique recurring revenue management dashboard that contains the user interface.

25. A method as in claim 24, further comprising mapping, by the one or more processors, selected ones of the one more asset data objects to each of the one or more roles.

26. A method as in claim 19, wherein the graphical representation of the one or more asset data objects further comprises a graphical representation of a ranking of the one or more asset data objects.

27. A method as in claim 26, wherein the graphical representation of the ranking is based a representation of a time from an expiration of each of the one or more asset data objects.

* * * * *